US012786770B2

(12) United States Patent
Sun et al.

(10) Patent No.: US 12,786,770 B2
(45) Date of Patent: Nov. 3, 2026

(54) MEASUREMENT RELAXATION METHOD AND APPARATUS, TERMINAL, AND NETWORK-SIDE DEVICE

(71) Applicant: VIVO MOBILE COMMUNICATION CO., LTD., Dongguan (CN)

(72) Inventors: Yanliang Sun, Dongguan (CN); Li Chen, Dongguan (CN); Wei Bao, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 268 days.

(21) Appl. No.: 18/432,486

(22) Filed: Feb. 5, 2024

(65) Prior Publication Data

US 2024/0179553 A1 May 30, 2024

Related U.S. Application Data

(63) Continuation of application No. PCT/CN2022/109998, filed on Aug. 3, 2022.

(30) Foreign Application Priority Data

Aug. 6, 2021 (CN) ......................... 202110904343.0

(51) Int. Cl.
*H04W 24/10* (2009.01)
*H04L 43/0811* (2022.01)
(Continued)

(52) U.S. Cl.
CPC ......... *H04W 24/10* (2013.01); *H04L 43/0811* (2013.01); *H04W 52/02* (2013.01); *H04W 64/006* (2013.01)

(58) Field of Classification Search
None
See application file for complete search history.

(56) References Cited

U.S. PATENT DOCUMENTS

2011/0310753 A1* 12/2011 Chou .................... H04W 48/16 370/252
2013/0225169 A1 8/2013 Farnsworth et al.
(Continued)

FOREIGN PATENT DOCUMENTS

CN 104247515 A 12/2014
CN 110839254 A 2/2020
(Continued)

OTHER PUBLICATIONS

LG Electronics, "Performance Impact on measurement relaxation for power saving", 3GPP TSG-RAN WG4 Meeting # 95-e, Electronic Meeting, May 25-Jun. 5, 2020, R4-2006695.
(Continued)

*Primary Examiner* — Kiet Tang
(74) *Attorney, Agent, or Firm* — The Webb Law Firm

(57) ABSTRACT

A measurement relaxation method includes determining, by the terminal based on a measurement result for each of at least one cell group, a low mobility state determination criterion, and a cell center determination criterion, a low mobility state determination result and a cell center determination result for each of the at least one cell group; and performing, by the terminal, measurement relaxation in a serving cell in each cell group based on the low mobility state determination result and cell center determination result for the cell group.

20 Claims, 6 Drawing Sheets

(51) Int. Cl.
*H04W 52/02* (2009.01)
*H04W 64/00* (2009.01)

(56) References Cited

U.S. PATENT DOCUMENTS

| | | | | |
|---|---|---|---|---|
| 2018/0302817 | A1 | 10/2018 | Teshima et al. | |
| 2020/0314868 | A1 | 10/2020 | Tseng et al. | |
| 2021/0105719 | A1 | 4/2021 | Thangarasa et al. | |
| 2021/0167874 | A1 | 6/2021 | Jiang | |
| 2021/0235344 | A1 | 7/2021 | Jung et al. | |
| 2022/0338124 | A1* | 10/2022 | Sabouri-Sichani | H04W 24/08 |
| 2024/0172020 | A1* | 5/2024 | Li | H04W 36/0085 |
| 2024/0292252 | A1* | 8/2024 | Shi | H04W 52/0245 |

FOREIGN PATENT DOCUMENTS

| | | | |
|---|---|---|---|
| CN | 111919468 | A | 11/2020 |
| CN | 112020872 | A | 12/2020 |
| CN | 112867028 | A | 5/2021 |
| EP | 3716718 | A1 | 9/2020 |
| WO | 2021150075 | A1 | 7/2021 |

OTHER PUBLICATIONS

LG Electronics, "RRM relaxation for stationary RedCap UEs", 3GPP TSG-RAN WG2 Meeting #114-e, Online, May 19-27, 2021, R2-2105788.

Mediatek Inc., "Email discussion summary for [97e][233] NR_UE_pow_sav_enh", 3GPP TSG-RAN WG4 Meeting # 97-e, Electronic Meeting, Nov. 2-13, 2020, R4-2017303.

Oppo, "Discussion on RRM relax for RedCap UEs", 3GPP TSG-RAN WG2 Meeting #114 electronic, Online, May 19-27, 2021, R2-2104811.

Samsung, "RRM measurement relaxation", 3GPP TSG-RAN WG2 Meeting #109-e, Online, Feb. 24-Mar. 6, 2020, R2-2001577.

Samsung, "RRM relaxation criteria for RedCap devices", 3GPP TSG-RAN WG2 Meeting #113bis-e, Electronic, Apr. 12-20, 2021, R2-2104081.

Ericsson, "Discussions on UE power saving for RLM and BM", 3GPP TSG-RAN WG4 Meeting #98bis-e, Electronic Meeting, Apr. 12-20, 2021, R4-2106852, 8 pages.

Samsung, "RRM measurement relaxation", 3GPP TSG-RAN WG2 Meeting #109-e, Online, Feb. 24-Mar. 6, 2020, R2-2001577, 5 pages.

* cited by examiner

MEASUREMENT RELAXATION METHOD AND APPARATUS, TERMINAL, AND NETWORK-SIDE DEVICE

CROSS-REFERENCE TO RELATED APPLICATIONS

This application is a Bypass Continuation application of International Patent Application No. PCT/CN2022/109998, filed Aug. 3, 2022, and claims priority to Chinese Patent Application No. 202110904343.0, filed Aug. 6, 2021, the disclosures of which are hereby incorporated by reference in their entireties.

BACKGROUND OF THE INVENTION

Field of the Invention

This application pertains to the field of communication technologies and relates to a measurement relaxation method and apparatus, a terminal, and a network-side device.

Description of Related Art

In existing mobile communication systems, to save power, terminals such as narrow band internet of things (NB-IOT) terminals can relax measurement of intra-frequency or inter-frequency neighboring cells in a case that measurement values of serving cells meet a measurement relaxation determination criterion. When determining that the measurement relaxation criterion is met, it is generally necessary to determine whether the terminals are in a low mobility state and/or at the cell center.

SUMMARY OF THE INVENTION

Embodiments of this application provide a measurement relaxation method and apparatus, a terminal, and a network-side device.

According to a first aspect, a measurement relaxation method is provided, where the method is applied to a terminal and includes:

- determining, by the terminal based on a measurement result for each of at least one cell group, a low mobility state determination criterion, and a cell center determination criterion, a low mobility state determination result and a cell center determination result for each of the at least one cell group; and
- performing, by the terminal, measurement relaxation in a serving cell in each cell group based on the low mobility state determination result and cell center determination result for the cell group.

According to a second aspect, a measurement relaxation method is provided, where the method is applied to a network-side device and includes:

- configuring, by the network-side device, a low mobility state determination criterion for a terminal, and sending it to the terminal; and
- receiving, by the network-side device, first indication information from the terminal, where the first indication information is used to indicate whether the terminal performs measurement relaxation in a serving cell in each of cell groups, whether the terminal performs measurement relaxation is determined based on a low mobility state determination result and a cell center determination result of the terminal for each cell group, and the low mobility state determination result and cell center determination result for each cell group are determined by the terminal based on a measurement result for each cell group, the low mobility state determination criterion, and a cell center determination criterion.

According to a third aspect, a measurement relaxation apparatus is provided, including:

- a determining module, configured to determine, based on a measurement result for each of at least one cell group, a low mobility state determination criterion, and a cell center determination criterion, a low mobility state determination result and a cell center determination result for each of the at least one cell group; and
- a processing module, configured to perform measurement relaxation in a serving cell in each cell group based on the low mobility state determination result and cell center determination result for the cell group.

According to a fourth aspect, a measurement relaxation apparatus is provided, including:

- a sending module, configured to configure a low mobility state determination criterion for a terminal; and
- a receiving module, configured to receive first indication information from the terminal, where the first indication information is used to indicate whether the terminal performs measurement relaxation in a serving cell in each of cell groups, whether the terminal performs measurement relaxation is determined based on a low mobility state determination result and a cell center determination result of the terminal for each cell group, and the low mobility state determination result and cell center determination result for each cell group are determined by the terminal based on a measurement result for each cell group, the low mobility state determination criterion, and a cell center determination criterion.

According to a fifth aspect, a terminal is provided. The terminal includes a processor, a memory, and a program or instructions stored in the memory and capable of running on the processor. When the program or instructions are executed by the processor, the steps of the method according to the first aspect are implemented.

According to a sixth aspect, a terminal is provided, including a processor and a communication interface. The processor is configured to: determine, based on a measurement result for each of at least one cell group, a low mobility state determination criterion, and a cell center determination criterion, a low mobility state determination result and a cell center determination result for each of the at least one cell group; and perform measurement relaxation in a serving cell in each cell group based on the low mobility state determination result and cell center determination result for the cell group. The communication interface is configured to obtain a measurement result of each of the at least one cell group.

According to a seventh aspect, a network-side device is provided. The network-side device includes a processor, a memory, and a program or instructions stored in the memory and capable of running on the processor. When the program or instructions are executed by the processor, the steps of the method according to the second aspect are implemented.

According to an eighth aspect, a network-side device is provided, including a processor and a communication interface. The processor is configured to configure a low mobility state determination criterion for a terminal and send it to the terminal. The communication interface is configured to receive first indication information from the terminal, where the first indication information is used to indicate whether the terminal performs measurement relaxation in a serving cell in each of at least one cell group, whether the terminal performs measurement relaxation is determined based on a low mobility state determination result and a cell center determination result of the terminal for each of the at least one cell group, and the low mobility state determination result and cell center determination result for each cell group are determined by the terminal based on a measurement result for each cell group, the low mobility state determination criterion, and a cell center determination criterion.

According to a ninth aspect, a non-transitory readable storage medium is provided. The non-transitory readable storage medium has a program or instructions stored thereon. When the program or the instructions are executed by a processor, the steps of the method according to the first aspect are implemented, or the steps of the method according to the second aspect are implemented.

According to a tenth aspect, a chip is provided. The chip includes a processor and a communication interface. The communication interface is coupled to the processor, and the processor is configured to run a program or instructions to implement the method according to the first aspect or the method according to the second aspect.

According to an eleventh aspect, a computer program/program product is provided. The computer program/program product is stored in a non-transitory storage medium. The program/program product is executed by at least one processor to implement the steps of the measurement relaxation method according to the first aspect or the second aspect.

DESCRIPTION OF THE INVENTION

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that terms used in this way are interchangeable in appropriate circumstances so that the embodiments of this application can be implemented in other orders than the order illustrated or described herein. In addition, "first" and "second" are usually used to distinguish objects of a same type, and do not restrict a quantity of objects. For example, there may be one or a plurality of first objects. In addition, "and/or" in the specification and claims represents at least one of connected objects, and the character "/" generally indicates that the associated objects have an "or" relationship.

It is worth noting that technologies described in the embodiments of this application are not limited to a long term evolution (LTE)/LTE-Advanced (LTE-A) system, and may also be applied to other wireless communication systems such as code division multiple access (CDMA), time division multiple access (TDMA), frequency division multiple access (FDMA), orthogonal frequency division multiple access (OFDMA), single-carrier frequency division multiple access (SC-FDMA), and other systems. The terms "system" and "network" in the embodiments of this application are often used interchangeably, and the technology described herein may be used in the above-mentioned systems and radio technologies as well as other systems and radio technologies. In the following descriptions, a new radio (NR) system is described for illustration purposes, and NR terms are used in most of the following descriptions, although these technologies may also be applied to other applications than the NR system application, for example, the 6th generation (6G) communication system.

Figure 1:
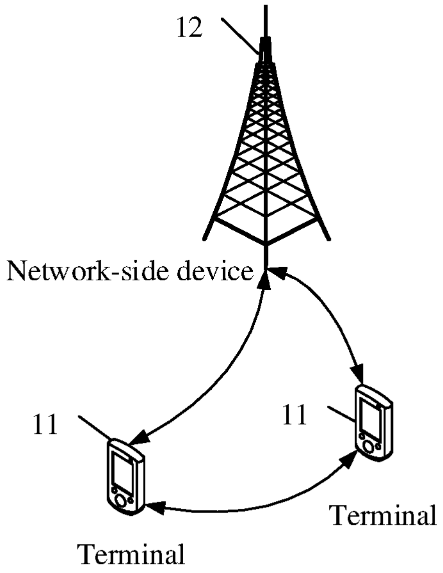
FIG. 1 is a structural diagram of a wireless communication system to which embodiments of this application are applicable.

FIG. 1 is a structural diagram of a wireless communication system to which embodiments of this application are applicable. The wireless communication system includes a terminal 11 and a network-side device 12. The terminal 11 may also be referred to as a terminal device or user equipment (UE). The terminal 11 may be a terminal-side device, such as a mobile phone, a tablet personal computer, a laptop computer or a notebook computer, a personal digital assistant (PDA), a palmtop computer, a netbook, an ultra-mobile personal computer (UMPC), a mobile internet device (MID), an augmented reality (AR)/virtual reality (VR) device, a robot, a wearable device, vehicular user equipment (VUE), pedestrian user equipment (PUE), smart home (a home device with wireless communication, such as refrigerator, TV, washing machine or furniture), where the wearable device includes a smart watch, a smart wrist strap, a smart headphone, a smart glasses, a smart jewelry (smart bracelet, smart chain bracelet, a smart ring, smart necklace, smart anklet, smart chain anklet, and the like), a smart wristband, a smart clothing, a game console, and the like. It should be noted that the terminal 11 is not limited to any particular type in the embodiments of this application. The network-side device 12 may be a base station or a core network. The base station may be referred to as an access point, a base transceiver station (Base Transceiver Station, BTS), a radio base station, a radio transceiver, a basic service set (BSS), an extended service set (ESS), a Node B, an evolved node B (eNB), a home NodeB, a home evolved NodeB, a WLAN access point, a Wi-Fi node, a transmission reception point (TRP), or other appropriate terms in the art. Provided that the same technical effects are achieved, the base station is not limited to any specific technical term. It should be noted that in the embodiments of this application, only the base station in the NR system is used as an example, although the base station is not limited to any specific type.

For terminals in an idle state, to determine whether they are in a low mobility state, it is only necessary to determine the low mobility state and/or the cell center based on a current camp-on cell. However, in other scenarios, such as scenarios in which carrier aggregation (CA) or dual connectivity (DC) is supported, the terminals may all be configured to connect to multiple serving cells, and these serving cells may be distributed in one or more cell groups. Additionally, the terminals are in a connected state. Therefore, it is necessary for those skilled in the art to develop a solution for determining whether the terminals should perform measurement relaxation in connected-state scenarios.

The following describes the measurement relaxation method provided in the embodiments of this application by using some embodiments and application scenarios thereof with reference to the accompanying drawings.

Figure 2:
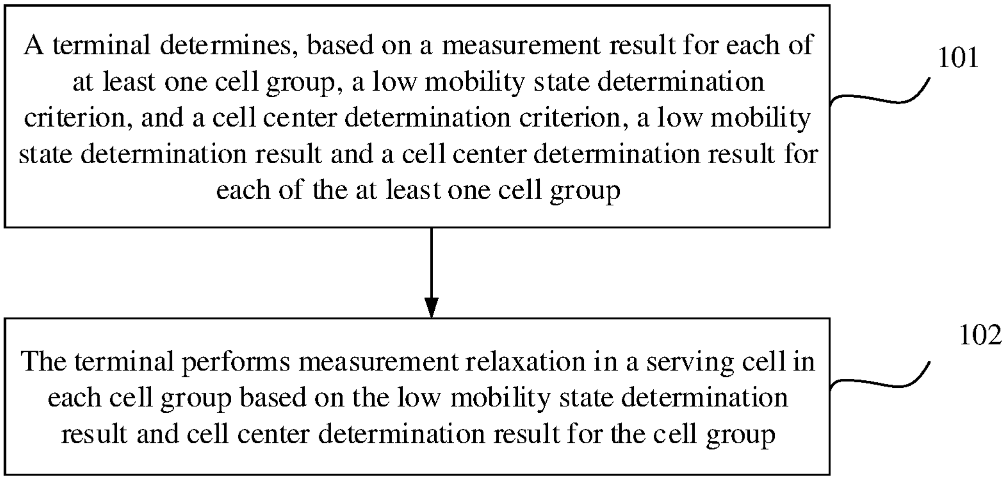
FIG. 2 is a first schematic flowchart of a measurement relaxation method according to an embodiment of this application.

FIG. 2 is a first schematic flowchart of a measurement relaxation method according to an embodiment of this application. As shown in FIG. 2, the measurement relaxation method provided in this embodiment includes the following steps.

Step 101. A terminal determines, based on a measurement result for each of at least one cell group, a low mobility state determination criterion, and a cell center determination criterion, a low mobility state determination result and a cell center determination result for each of the at least one cell group.

For example, in a connected-state scenario, the terminal is configured with one or more cell groups, and each cell group has at least one serving cell. For at least one cell group, the terminal determines, based on a measurement result for each of the at least one cell group and a low mobility state determination criterion, a low mobility state determination result of the terminal for the cell group. For example, if the measurement result for each cell group satisfies a low mobility condition of the low mobility state determination criterion, the low mobility state determination result of the terminal for the cell group is being in a low mobility state, otherwise the low mobility state determination result of the terminal for the cell group is not being in a low mobility state.

The terminal determines the cell center determination result of the terminal for each cell group based on the measurement result for the cell group and the cell center determination criterion. For example, if the measurement result for the cell group satisfies a cell center condition of the cell center determination criterion, the cell center determination result of the terminal for the cell group is being at the cell center, otherwise the cell center determination result of the terminal for the cell group is not being at the cell center.

Optionally, the low mobility state determination result of the terminal for the cell group may be determined based on a measurement result for one serving cell in the cell group and a corresponding low mobility state determination criterion, or may be determined based on measurement results for multiple serving cells in the cell group and low mobility states respectively corresponding to the multiple serving cells. Optionally, the cell center determination result of the terminal for the cell group may be determined based on a measurement result for one serving cell in the cell group and a corresponding cell center determination criterion, or may be determined based on measurement results for multiple serving cells in the cell group and cell center determination results respectively corresponding to the multiple serving cells.

Step 102. The terminal performs measurement relaxation in a serving cell in each cell group based on the low mobility state determination result and cell center determination result for the cell group.

Optionally, for any cell group, the terminal determines, based on the low mobility state determination result and cell center determination result for the cell group, whether measurement relaxation can be performed in the serving cell in the cell group. If yes, the terminal performs measurement relaxation in the serving cell in the cell group. Optionally, for all of the at least one cell group, the terminal performs measurement relaxation in serving cells in all of the at least one cell group.

For example, for cell group a and cell group b, if low mobility state determination results of the terminal are both being in a low mobility state, and cell center determination results of the terminal are both being at the cell center, measurement relaxation is performed in cell group a and cell group b; and if a low mobility state determination result for cell group c is not being in a low mobility state or if a cell center determination result for cell group c is not being at the cell center, measurement relaxation is not performed in cell group c.

Optionally, the terminal may alternatively determine, based on the low mobility state determination result for the cell group and a cell center determination result for each serving cell in the cell group, whether measurement relaxation can be performed in the serving cell in the cell group.

For example, if low mobility state determination results of the terminal for cell group a are all being in a low mobility state, and cell center determination results for serving cell 1 and serving cell 2 in cell group a are all being at the cell center, measurement relaxation is performed in serving cell 1 and serving cell 2 in cell group a; and if a cell center determination result for serving cell 3 in cell group a is not being at the cell center, measurement relaxation is not performed for serving cell 3 in cell group a.

Optionally, the terminal may alternatively determine, based on a low mobility state determination result and a cell center determination result for each serving cell in the cell group, whether measurement relaxation can be performed in the serving cell in the cell group.

For example, for serving cell 1 and serving cell 2, if low mobility state determination results of the terminal in cell group a are both being in a low mobility state, and cell center determination results of the terminal are both being at the cell center, measurement relaxation is performed in serving cell 1 and serving cell 2 in cell group a; and if a low mobility state determination result for serving cell 3 in cell group a is not being in a low mobility state or if a cell center determination result for serving cell 3 is not being at the cell center, measurement relaxation is not performed in serving cell 3 in cell group a.

For example, the measurement relaxation means that a measurement gap may be increased or the measurement may not be performed for a certain period of time, so as to reduce power consumption of the terminal.

In the method of this embodiment, the terminal determines, based on the measurement result for each of the at least one cell group, the low mobility state determination criterion, and the cell center determination criterion, the low mobility state determination result and cell center determination result for each of the at least one cell group; determines, based on the low mobility state determination result and cell center determination result for each cell group, whether measurement relaxation can be performed in the serving cell in the cell group; and performs measurement relaxation in the serving cell in each cell group. This can enable the terminal to determine, in a case of multiple serving cells configured by a network-side device, whether to perform measurement relaxation based on actual situation of each cell group or each serving cell, providing good flexibility in terms of compromise between communication performance and power saving performance.

Optionally, the measurement relaxation includes at least one of the following: radio link monitoring (RLM) measurement relaxation, beam failure detection (BFD) measurement relaxation, or radio resource management (RRM) measurement relaxation.

Optionally, a cell group CG configured with a low mobility state determination criterion includes only CG in an NR system and includes no CG in LTE.

In this embodiment of this application, the measurement result is a measurement result of at least one of the following reference signals:

synchronization signal and PBCH block (SSB);

channel state information reference signal (CSI-RS) for time-frequency domain tracking;

CSI-RS for channel state measurement; or

CSI-RS for mobility measurement.

Optionally, the measurement result includes any one of the following or a combination thereof:

reference signal received power (RSRP);

reference signal received quality (RSRQ); and signal to interference plus noise ratio (SINR).

Optionally, in a case of the measurement result being a combination, the measurement result includes at least the reference signal received power RSRP.

Optionally, RSRP, RSRQ, or SINR is a smoothed filtered measurement result.

In this embodiment of this application, how to determine whether measurement relaxation is performed based on the low mobility state determination result and the cell center determination result can be achieved in the following ways.

One Implementation

For any cell group, in a case that the low mobility state determination result of the terminal for the cell group is being in a low mobility state and the cell center determination result of the terminal for the cell group is being at the cell center, the terminal determines to perform measurement relaxation in a serving cell in the cell group, where the cell center determination result is obtained based on a cell center determination result corresponding to at least one serving cell in the cell group.

Optionally, for any cell group, two conditions, namely, a low mobility condition in the low mobility determination criterion and a cell center condition in the cell center determination criterion, need to be both satisfied, and thus performing measurement relaxation in the serving cell in the cell group, optionally, the low mobility state determination result of the terminal for the cell group, needs to satisfy being in a low mobility state, and the cell center determination result needs to satisfy being in a cell center.

The low mobility state determination result by the terminal for the cell group is obtained based on a low mobility state determination result corresponding to at least one serving cell in the cell group. This may be obtained, for example, in the following way:

in a case that the terminal is in a low mobility state in at least one serving cell in the cell group, the terminal determines that the low mobility state determination result of the terminal for the cell group is being in the low mobility state; or in a case that the terminal is in a low mobility state in all serving cells in the cell group, the terminal determines that the low mobility state determination result of the terminal for the cell group is being in the low mobility state.

The cell center determination result by the terminal for the cell group is obtained based on a cell center determination result corresponding to at least one serving cell in the cell group. This may be obtained, for example, in the following way:

in a case that the terminal is in a cell center in at least one serving cell in the cell group, the terminal determines that the cell center determination result of the terminal for the cell group is being at the cell center; or in a case that the terminal is in a cell center in all serving cells in the cell group, the terminal determines that the cell center determination result of the terminal for the cell group is being at the cell center.

For example, if a low mobility state determination result of the terminal for cell group a is being in a low mobility state, and a cell center determination result is being at the cell center, measurement relaxation is performed in cell group a.

Another Implementation

For any cell group, in a case that the cell center determination result of the terminal for the cell group is being in a cell center and a cell center determination result for at least one serving cell in the cell group is being at the cell center, the terminal determines to perform measurement relaxation in each of the at least one serving cell.

Optionally, for any cell group, in a case that the low mobility state determination result of the terminal for the cell group is being in a low mobility state and a cell center determination result for at least one serving cell in the cell group is being at the cell center, the terminal determines to perform measurement relaxation in each of the at least one serving cell, optionally, the terminal performs measurement relaxation only in a serving cell for which a cell center determination result is being at the cell center.

For example, if low mobility state determination results of the terminal for serving cell 1 and serving cell 2 in cell group a are both being in a low mobility state, and cell center determination results are both being at the cell center, measurement relaxation is performed in serving cell 1 and serving cell 2 in cell group a.

In the foregoing embodiment, for any cell group, two determination criteria need to be both satisfied to perform measurement relaxation, optionally, the low mobility state determination result of the terminal for the cell group needs to satisfy being in a low mobility state and the cell center determination result needs to satisfy being at the cell center, which can guarantee the communication performance of the terminal, and measurement relaxation can also be performed in each serving cell in the cell group, which is more flexible.

In this embodiment of this application, step 102 further includes the following possible implementations:

for a new radio NR master cell group (MCG) in the at least one cell group, in a case that measurement relaxation is determined to be performed in a serving cell in the MCG based on a low mobility state determination result and a cell center determination result for the MCG, the terminal performs measurement relaxation in serving cells in all of the at least one cell group; or in a case that measurement relaxation is determined to be performed for a secondary cell group (SCG) in the at least one cell group based on the low mobility state determination result and cell center determination result, the terminal performs measurement relaxation in a serving cell in the SCG.

Optionally, in a case that a new radio NR MCG exists in multiple cell groups configured for the terminal, measurement relaxation is determined to be performed in other cell groups based on a determination result of performing measurement relaxation in the MCG, optionally, the terminal performs measurement relaxation in serving cells in all of the cell groups in a case that measurement relaxation is determined to be performed in a serving cell in the MCG based on a low mobility state determination result and a cell center determination result for the MCG.

In a case that an SCG exists in the cell groups and that measurement relaxation is determined to be performed in a serving cell in the SCG based on a low mobility state determination result and a cell center determination result for the SCG, the terminal performs measurement relaxation in the serving cell in the SCG.

For example, for secondary cell groups SCG1 and SCG2, if low mobility state determination results of the terminal are both being in a low mobility state, and cell center determination results of the terminal are both being at the cell center, the terminal performs measurement relaxation in serving cells in secondary cell groups SCG1 and SCG2; and if a low mobility state determination result for secondary cell group SCG3 is not being in a low mobility state or if a cell center determination result for secondary cell group SCG3 is not being at the cell center, the terminal does not perform measurement relaxation in a serving cell in SCG3.

Optionally, in a case that measurement relaxation is not performed in a master cell group MCG, that a cell center determination result for an SCG present in each cell group is being at the cell center, and that a low mobility state determination result for that SCG is being in a low mobility state, the terminal performs measurement relaxation in that SCG.

In other words, if it is determined that the terminal cannot perform measurement relaxation in the serving cell in the master cell group MCG, the cell center determination result and low mobility state determination result of the terminal for the secondary cell group SCG must satisfy both a cell center condition and a low mobility condition before the terminal can perform measurement relaxation in the serving cell in that SCG, optionally, the terminal can execute measurement relaxation in the serving cell in that SCG only if the cell center determination result for the SCG is being at the cell center and the low mobility state determination result for the SCG is being in a low mobility state.

Optionally, in the case that "the terminal performs measurement relaxation in serving cells in all of the cell groups" in the first implementation, for secondary cell groups SCG in all of the cell groups, it can be determined whether cell center determination results of the terminal for the SCGs are being at the cell center; and if the cell center determination results are being at the cell center, the terminal performs measurement relaxation in the serving cells in these SCGs.

In the foregoing embodiment, in the case that measurement relaxation is determined to be performed in the serving cell in the MCG, measurement relaxation is directly performed in other cell groups without determining whether measurement relaxation can be performed in the other cell groups, which saves the time for the determination and reduces the power consumption of the terminal.

Figure 3:
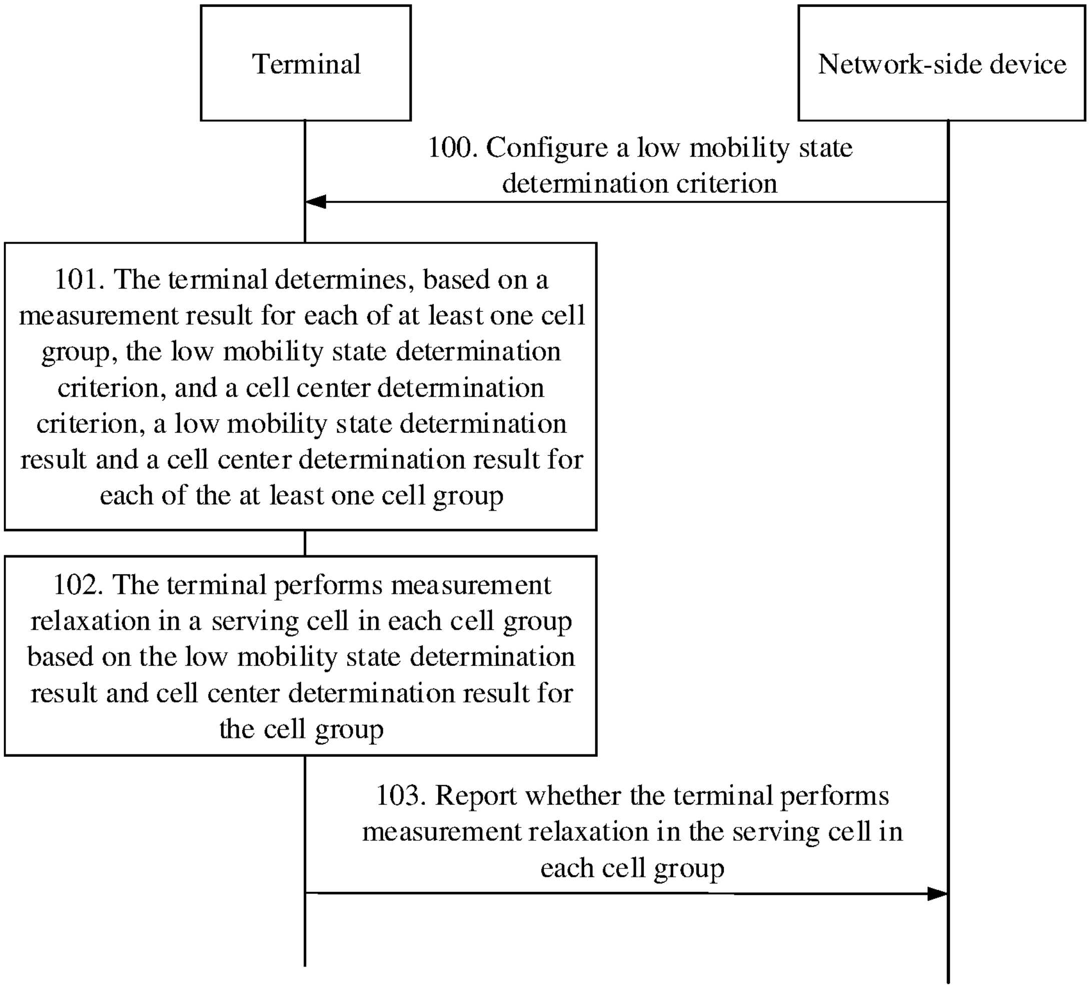
FIG. 3 is a schematic interaction flowchart of a measurement relaxation method according to an embodiment of this application.

In this embodiment of this application, as shown in FIG. 3, the low mobility state determination criterion is configured by a network-side device, and a configuration mode for the low mobility state determination criterion includes, for example, terminal-based configuration, cell group-based configuration, or serving cell-based configuration.

Optionally, the terminal-based configuration means that a configuration level of the low mobility state determination criterion is at the terminal level, optionally, the configuration is in effect for all serving cells in all cell groups for the terminal; the cell group-based configuration means that a configuration level of the low mobility state determination criterion is at the cell group level, optionally, the configuration is in effect for all serving cells in a particular cell group for the terminal; and the serving cell-based configuration, it means that a configuration level of the low mobility state determination criterion is at the serving cell level, optionally, the configuration is in effect for a particular serving cell for the terminal.

Step 101 in which "a terminal determines, based on a measurement result for each cell group and a low mobility state determination criterion, a low mobility state determination result for each cell group" can be implemented in several ways as follows:

One Way

In a case that a configuration mode for the low mobility state determination criterion is based on terminal configuration, the terminal determines the low mobility state determination result of the terminal for each cell group based on a measurement result for a primary secondary cell (PSCell) in an NR secondary cell group SCG configured for the first time by the network-side device;

the terminal determines the low mobility state determination result of the terminal for each cell group based on a measurement result for a primary cell (PCell) or a primary secondary cell PSCell in the cell group; or the terminal determines the low mobility state determination result of the terminal for each cell group based on a measurement result for at least one serving cell in the cell group; and in a case that a configuration mode for the low mobility state determination criterion is based on cell group configuration, the terminal determines the low mobility state determination result of the terminal for each cell group based on a measurement result for a primary cell PCell or a primary secondary cell PSCell in the cell group; or the terminal determines the low mobility state determination result of the terminal for each cell group based on a measurement result for at least one serving cell in the cell group.

Optionally, the network-side device may configure the low mobility state determination criterion based on the terminal, the serving cell, or the cell group, so the way in which the terminal determines the low mobility state of the cell group may vary with configuration modes. Optionally, the terminal needs to know measurement result(s) of which cell or cells in the cell group, based on which to determine a low mobility state of the terminal in the cell group, and therefore the terminal needs to be informed of a current configuration mode for the low mobility state determination criterion from the network-side device, and then the terminal determines the low mobility state of the terminal in the cell group based on the configuration mode.

For the configuration mode based on the terminal configuration, the low mobility state determination criterion configured for the terminal is applicable to all cell groups, in other words, the same low mobility state determination criterion may be used for each cell group; and the low mobility state determination criterion may be or may not be configured for a certain terminal.

For the configuration mode based on cell group configuration, different cell groups are separately configured with a low mobility state determination criterion, values of relevant parameters of the low mobility state determination criteria configured for different cell groups may be the same or different, and the low mobility state determination criterion may be or may not be configured for a certain cell group. If the low mobility state determination criterion is not configured for a certain cell group, the terminal does not need to determine whether it is in a low mobility state in that cell group and does not perform measurement relaxation in that cell group.

For the configuration mode based on serving cell configuration, different serving cells are separately configured with a low mobility state determination criterion, values of relevant parameters of the low mobility state determination criteria configured for different serving cells may be the same or different, and the low mobility state determination criterion may be or may not be configured for a certain serving cell. If the low mobility state determination criterion is not configured for a certain serving cell, the terminal does not need to determine whether it is in a low mobility state in that serving cell and does not perform measurement relaxation in that serving cell.

For any cell group, in a first case that "a configuration mode for the low mobility state determination criterion is based on terminal configuration", the terminal determines a low mobility state determination result of the terminal for the cell group based on a measurement result of a primary secondary cell PSCell in an NR SCG configured for the first time by the network-side device, optionally, determines whether the low mobility state determination result of the terminal for the cell group is being in a low mobility state. For example, by comparing the measurement result for the primary secondary cell PSCell with a measurement reference value, if a difference therebetween is small, the terminal is in the low mobility state; and if the difference therebetween is large, the terminal is not in the low mobility state. The configuration for the first time refers, for example, to a first RRC reconfiguration message including SCG configuration that the terminal receives after entering an RRC connected state. An initial value of the measurement reference value may be configured by the network-side device or determined by the terminal itself. Optionally, the measurement reference value may also be updated based on the measurement result. In other words, in this case, the low mobility state determination result of the terminal for the primary secondary cell PSCell may be used to indicate the low mobility state determination result of the terminal for the cell group.

In a second case that "a configuration mode for the low mobility state determination criterion is based on terminal configuration", the terminal determines the low mobility state determination result of the terminal for the cell group based on a measurement result of the primary cell PCell or a the primary secondary cell PSCell in the cell group, optionally, determines whether the low mobility state determination result of the terminal for the cell group is being in a low mobility state. If a primary cell PCell exists, the low mobility state determination result of the terminal for the cell group is determined based on a measurement result for the primary cell PCell; and if no primary cell PCell exists and a primary secondary cell PSCell exists, the low mobility state determination result of the terminal for the cell group is determined based on a measurement result for the primary secondary cell PSCell. For example, the measurement result for the primary cell PCell or the primary secondary cell PSCell is compared with a measurement reference value. If a difference therebetween is small, the terminal is in the low mobility state; and if a difference therebetween is large, the terminal is not in the low mobility state. In other words, in this case, the low mobility state determination result of the terminal for the primary cell PCell or the primary secondary cell PSCell may be used to indicate the low mobility state determination result of the terminal for the cell group.

In a third case that "a configuration mode for the low mobility state determination criterion is based on terminal configuration", the terminal determines the low mobility state determination result of the terminal for the cell group based on a measurement result for each serving cell in the cell group, optionally, determines whether the low mobility state determination result of the terminal for the cell group is being in a low mobility state. For example, if low mobility determination results of the terminal for all serving cells can be separately determined, the terminal determines, based on the low mobility determination results of the terminal for all of the serving cells, whether the low mobility state determination result of the terminal for the cell group is being in a low mobility state. For example, if the terminal is in a low mobility state in at least one of the serving cells, the terminal can determine that the low mobility state determination result of the terminal for the cell group is being in the low mobility state, or if the terminal is in a low mobility state in all of the serving cells, the terminal can determine that the low mobility state determination result of the terminal for the cell group is being in the low mobility state.

In a first case that "a configuration mode for the low mobility state determination criterion is based on cell group configuration", the terminal determines the low mobility state determination result of the terminal for the cell group based on a measurement result for a primary cell PCell or a primary secondary cell PSCell in the cell group, which is similar to the terminal-based configuration embodiment, and details are not repeated herein.

In a second case that "a configuration mode for the low mobility state determination criterion is based on cell group configuration", the terminal determines the low mobility state determination result of the terminal for the cell group based on a measurement result for each serving cell in the cell group, which is similar to the terminal-based configuration embodiment, and details are not repeated herein.

Optionally, that "the terminal determines the low mobility state determination result of the terminal for the cell group based on a measurement result for each serving cell in the cell group" may be implemented in several ways as follows:

- in a case that the terminal is in a low mobility state in at least one serving cell in the cell group, the terminal determines that the low mobility state determination result of the terminal for the cell group is being in the low mobility state; or
- in a case that the terminal is in a low mobility state in all serving cells in the cell group, the terminal determines that the low mobility state determination result of the terminal for the cell group is being in the low mobility state.

In the foregoing embodiment, the terminal can determine, based on the configuration mode for the low mobility state determination criterion sent by the network-side device, measurement results for which serving cells in the cell group and a low mobility state determination result of the terminal for the cell group, with low processing complexity.

In this embodiment of this application, the cell center determination criterion may be configured by the network-side device, or may be predefined or implicitly configured.

The network-side device may configure the cell center determination criterion based on the terminal, the serving cell, or the cell group, so the way in which the terminal determines the cell center determination result for the cell group may vary with configuration modes. Optionally, the terminal needs to know measurement result(s) of which cell or cells in the cell group, based on which to determine the cell center determination result of the terminal for the cell group, and therefore the terminal needs to be informed whether the cell center determination criterion has been configured for each of the serving cells in the cell group, and then determine the cell center determination result of the terminal for the cell group.

For the configuration mode based on the terminal configuration, the cell center determination criterion configured for the terminal is applicable to all cell groups; and the cell center determination criterion may be or may not be configured for a certain terminal.

For the configuration mode based on cell group configuration, different cell groups are separately configured with a cell center determination criterion, values of relevant parameters of the cell center determination criteria configured for different cell groups may be the same or different, and the cell center determination criterion may be or may not be configured for a certain cell group. If no cell center determination criterion is configured for a cell group, a criterion by which the terminal determines whether it is at the cell center in the cell group is predefined by a protocol or customized by the terminal.

For the configuration mode based on serving cell configuration, different serving cells are separately configured with a cell center determination criterion, values of relevant parameters of the cell center determination criteria configured for different serving cells may be the same or different, and the cell center determination criterion may be or may not be configured for a certain serving cell. If no cell center determination criterion is configured for a serving cell, a criterion by which the terminal determines whether it is at the cell center in the serving cell is predefined by a protocol or customized by the terminal.

If the cell center determination criterion is not configured by the network-side device, for example, it is predefined, the cell center determination result of the terminal for the cell group may be determined based on the same configuration mode as the low mobility state determination criterion. Optionally, in a case that the low mobility state determination criterion is configured by a network-side device, if a configuration mode for the low mobility state determination criterion is based on terminal configuration, a configuration mode for the cell center determination criterion is based on terminal configuration;

- if a configuration mode for the low mobility state determination criterion is based on cell group configuration, a configuration mode for the cell center determination criterion is based on cell group configuration; and
- if a configuration mode for the low mobility state determination criterion is based on serving cell configuration, a configuration mode for the cell center determination criterion is based on serving cell configuration.

In the foregoing embodiment, there is greater flexibility in configuring a cell center determination criterion. Because whether a terminal is at the cell center depends on the implementation performance and algorithm of the terminal, a configuration mode for an actual cell center determination criterion can be more flexible. By using a configuration mode for the low mobility state to determine a configuration mode for the cell center determination criterion, a better reduction in signaling overheads can be achieved.

In this embodiment of this application, step 101 in which "a terminal determines, based on a measurement result for each cell group and a cell center determination criterion, a cell center determination result for each cell group" can be implemented in the following way:

- in a case that a configuration mode for the cell center determination criterion is based on terminal configuration, the terminal determines the cell center determination result of the terminal for each cell group based on a measurement result for a primary secondary cell PSCell in an NR secondary cell group SCG configured for the first time by the network-side device;
- the terminal determines the cell center determination result of the terminal for each cell group based on a measurement result for a primary cell PCell or a primary secondary cell PSCell in the cell group; or
- the terminal determines the cell center determination result of the terminal for each cell group based on a measurement result for each serving cell in the cell group; and
- in a case that a configuration mode for the cell center determination criterion is based on cell group configuration,
- the terminal determines the cell center determination result of the terminal for each cell group based on a measurement result for a primary cell PCell or a primary secondary cell PSCell in the cell group; or
- the terminal determines the cell center determination result of the terminal for each cell group based on a measurement result for each serving cell in the cell group.

Optionally, for any cell group, in a first case that "a configuration for the cell center determination criterion is based on terminal configuration", the terminal determines the cell center determination result of the terminal for the cell group based on a measurement result of a primary secondary cell PSCell in an NR SCG configured for the first time by the network-side device, optionally, determines whether the cell center determination result of the terminal for the cell group is being at the cell center. For example, by comparing the measurement result for the primary secondary cell PSCell with a threshold, if the measurement is greater than the threshold, the terminal is at the cell center; and if the measurement is less than the threshold, the terminal is not at the cell center. The threshold may be configured by the network-side device or determined by the terminal itself. In other words, in this case, the cell center determination result of the terminal for the primary secondary cell PSCell may be used to indicate the cell center determination result of the terminal for the cell group.

In a second case that "a configuration mode for the cell center determination criterion is based on terminal configuration", the terminal determines the cell center determination result of the terminal for the cell group based on a measurement result of the primary cell PCell or a the primary secondary cell PSCell in the cell group, optionally, determines whether the cell center determination result of the terminal for the cell group is being at the cell center. If a primary cell PCell exists, the cell center determination result of the terminal for the cell group is determined based on a measurement result for the primary cell PCell; and if no primary cell PCell exists and a primary secondary cell PSCell exists, the cell center determination result of the terminal for the cell group is determined based on a measurement result for the primary secondary cell PSCell. For example, the measurement result for the primary cell PCell or the primary secondary cell PSCell is compared with a threshold; if the measurement result is greater than the threshold, the terminal is at the cell center; and if the measurement result is less than the threshold, the terminal is not in at the cell center. In other words, in this case, the cell center determination result of the terminal for the primary PCell or the primary secondary cell PSCell may be used to indicate the cell center determination result of the terminal for the cell group.

In a third case that "a configuration mode for the cell center determination criterion is based on terminal configuration", the terminal determines the cell center determination result of the terminal for the cell group based on a measurement result for each serving cell in the cell group, optionally, determines whether the cell center determination result of the terminal for the cell group is being at the cell center. For example, if low mobility determination results of the terminal for all serving cells can be separately determined, the terminal determines, based on the low mobility determination results of the terminal for all of the serving cells, whether the cell center determination result of the terminal for the cell group is being at the cell center. For example, if the terminal is at the cell center in at least one of the serving cells, the terminal can determine that the cell center determination result of the terminal for the cell group is being at the cell center, or if the terminal is at the cell center in all of the serving cells, the terminal can determine that the cell center determination result of the terminal for the cell group is being at the cell center.

In a first case that "a configuration mode for the cell center determination criterion is based on cell group configuration", the terminal determines the cell center determination result of the terminal for the cell group based on a measurement result for a primary cell PCell or a primary secondary cell PSCell in the cell group, which is similar to the terminal-based configuration embodiment, and details are not repeated herein.

In a second case that "a configuration mode for the cell center determination criterion is based on cell group configuration", the terminal determines the cell center determination result of the terminal for the cell group based on a measurement result for each serving cell in the cell group, which is similar to the terminal-based configuration embodiment, and details are not repeated herein.

Optionally, that "the terminal determines the cell center determination result of the terminal for the cell group based on a measurement result for each serving cell in the cell group" may be implemented in several ways as follows:

- in a case that the terminal is in a cell center in at least one serving cell in the cell group, the terminal determines that the cell center determination result of the terminal for the cell group is being at the cell center; or
- in a case that the terminal is in a cell center in all serving cells in the cell group, the terminal determines that the cell center determination result of the terminal for the cell group is being at the cell center.

In the foregoing embodiment, the terminal can determine, based on the configuration mode for the cell center determination criterion, measurement results for which serving cells in the cell group and a cell center determination result of the terminal for the cell group, with low processing complexity.

In an embodiment of this application, that "the terminal determines the low mobility state determination result of the terminal for the cell group based on a measurement result for a primary cell PCell or a primary secondary cell PSCell in the cell group" can be implemented in the following way:

- in a case that the cell group includes a cell of a first band and a cell of a second band, for the first band where a primary cell PCell or a primary secondary cell PSCell exists, the terminal determines a low mobility state determination result of the terminal in the first band based on a measurement result for the primary cell PCell or the primary secondary cell PSCell; and
- for the second band where no primary cell PCell or primary secondary cell PSCell exists, the terminal determines the low mobility state determination result of the terminal in the first band as a low mobility state determination result of the terminal in the second band.

Optionally, assuming that the cell group includes cells of multiple bands, for example, includes a cell of a first band and a cell of a second band, and assuming that a primary cell PCell or a primary secondary cell PSCell exists in the cell of the first band, and that no primary cell PCell or a primary secondary cell PSCell exists in the cell of the second band, the terminal determines, based on the primary cell PCell or the primary secondary cell PSCell, the low mobility state determination result of the terminal in the first band. Optionally, if a primary cell PCell exists, the terminal determines the low mobility state determination result of the terminal in the first band based on a measurement result for the primary cell PCell; and if no primary cell PCell exists and a primary secondary cell PSCell exists, the terminal determines the low mobility state determination result of the terminal in the first band based on a measurement result for the primary secondary cell PSCell. In other words, in this case, the low mobility state determination result of the terminal for the primary cell PCell or the primary secondary cell PSCell may be used to indicate the low mobility state determination result of the terminal in the first band.

Optionally, the terminal determines the low mobility state determination result in the first band as the low mobility determination result of the terminal in the second band, optionally, the low mobility determination result of the terminal in the second band may adopt the low mobility state determination result of the terminal in the first band.

In the foregoing embodiment, low mobility state determination results of the terminal in different bands can be determined separately for different bands, with greater flexibility.

In this embodiment of this application, that "the terminal determines the cell center determination result of the terminal for the cell group based on a measurement result for a primary cell PCell or a primary secondary cell PSCell in the cell group" can be implemented in the following way:

- in a case that the cell group includes a cell of a first band and a cell of a second band, for the first band where a primary cell PCell or a primary secondary cell PSCell exists, the terminal determines a cell center determination result of the terminal in the first band based on a measurement result for the primary cell PCell or the primary secondary cell PSCell; and for the second band where no primary cell PCell or primary secondary cell PSCell exists, the terminal determines a cell center determination result of the terminal in the second band based on a measurement result for a secondary cell SCell of the second band.

Optionally, for the first band, the terminal determines the cell center determination result of the terminal in the first band based on the primary cell PCell or the primary secondary cell PSCell. Optionally, if a primary cell PCell exists, the terminal determines the cell center determination result of the terminal in the first band based on a measurement result for the primary cell PCell; and if no primary cell PCell exists and a primary secondary cell PSCell exists, the terminal determines the cell center determination result of the terminal in the first band based on a measurement result for the primary secondary cell PSCell. In other words, in this case, the cell center determination result of the terminal for the primary PCell or the primary secondary cell PSCell may be used to indicate the cell center determination result of the terminal in the first band.

For the second band where no primary cell PCell or primary secondary cell PSCell exists, the terminal determines a cell center determination result of the terminal in the second band based on a measurement result for a secondary cell SCell of the second band.

For different bands, cell center determination results of the terminal in different bands may be determined separately.

Optionally, step 102 can be implemented in the following way:

the terminal performs measurement relaxation in a serving cell of a first band based on a low mobility state determination result and cell center determination result of the terminal in the first band; and the terminal performs measurement relaxation in a serving cell of a second band based on a low mobility state determination result and cell center determination result of the terminal in the second band.

Optionally, for different bands, it can be separately determined whether the terminal performs measurement relaxation in serving cells of different bands.

In the foregoing embodiment, for different bands, low mobility state determination results and cell center determination results of the terminal in different bands can be separately determined, and thus measurement relaxation can be separately performed in different bands, with greater flexibility.

In this embodiment of this application, step 101 of "determining, based on a measurement result for each cell group and a low mobility state determination criterion, a low mobility state determination result for each cell group" can be implemented in several ways as follows:

for any cell group, in a case that a configuration mode for the low mobility state determination criterion is based on serving cell configuration, the terminal determines the low mobility state determination result of the terminal for the cell group based on a measurement result for a first or latest serving cell configured with the low mobility state determination criterion;

the terminal determines the low mobility state determination result of the terminal for the cell group based on a measurement result for a primary cell PCell or a primary secondary cell PSCell in the cell group; or the terminal determines the low mobility state determination result of the terminal for the cell group based on a measurement result for at least one serving cell in the cell group.

Optionally, for any cell group, for the first case that "a configuration mode for the low mobility state determination criterion is based on serving cell configuration", the terminal determines the low mobility state determination result of the terminal for the cell group based on a measurement result of a first or latest serving cell configured with low mobility state determination criterion for the first time by the network-side device, optionally, determines whether the low mobility state determination result of the terminal for the cell group is being in a low mobility state. For example, by comparing the measurement result for the serving cell with a measurement reference value, if a difference therebetween is small, the terminal is in the low mobility state; and if the difference therebetween is large, the terminal is not in the low mobility state. An initial value of the measurement reference value may be configured by the network-side device or determined by the terminal itself.

The first or latest serving cell configured with the low mobility state determination criterion is a first serving cell configured when the network-side device configures a low mobility state determination criterion or a latest one configured. For example, if the network-side device indicates that serving cell 1, serving cell 2, and serving cell 3 are configured with a low mobility state determination criterion separately, for example, only one serving cell is configured with a low mobility state determination criterion at a time, serving cell 1 is the first serving cell configured with the low mobility state determination criterion, and the latest serving cell is, for example, a serving cell corresponding to a latest configuration from a current time.

In this case, the low mobility state determination result of the terminal for the first or latest serving cell configured with the low mobility state determination criterion may be used to indicate the low mobility state determination result of the terminal for the cell group.

In a second case that "a configuration mode for the low mobility state determination criterion is based on serving cell configuration", the terminal determines the low mobility state determination result of the terminal for the cell group based on a measurement result of the primary cell PCell or a the primary secondary cell PSCell in the cell group, optionally, determines whether the low mobility state determination result of the terminal for the cell group is being in a low mobility state. If a primary cell PCell exists, the low mobility state determination result of the terminal for the cell group is determined based on a measurement result for the primary cell PCell; and if no primary cell PCell exists and a primary secondary cell PSCell exists, the low mobility state determination result of the terminal for the cell group is determined based on a measurement result for the primary secondary cell PSCell. For example, the measurement result for the primary cell PCell or the primary secondary cell PSCell is compared with a measurement reference value. If a difference therebetween is small, the terminal is in the low mobility state; and if a difference therebetween is large, the terminal is not in the low mobility state. In other words, in this case, the low mobility state determination result of the terminal for the primary cell PCell or the primary secondary cell PSCell may be used to indicate the low mobility state determination result of the terminal for the cell group.

In a third case that "a configuration mode for the low mobility state determination criterion is based on serving cell configuration", the terminal determines the low mobility state determination result of the terminal for the cell group based on a measurement result for each serving cell in the cell group, optionally, determines whether the low mobility state determination result of the terminal for the cell group is being in a low mobility state. For example, if low mobility determination results of the terminal for all serving cells can be separately determined, the terminal determines, based on the low mobility determination results of the terminal for all of the serving cells, whether the low mobility state determination result of the terminal for the cell group is being in a low mobility state. For example, if the terminal is in a low mobility state in at least one of the serving cells, the terminal can determine that the low mobility state determination result of the terminal for the cell group is being in the low mobility state, or if the terminal is in a low mobility state in all of the serving cells, the terminal can determine that the low mobility state determination result of the terminal for the cell group is being in the low mobility state.

In the foregoing embodiment, the terminal can determine, based on the configuration mode for the low mobility state determination criterion sent by the network-side device, measurement results for which serving cells in the cell group and a low mobility state determination result of the terminal for the cell group, with low processing complexity.

In this embodiment of this application, step 101 of "determining, based on a measurement result for each cell group and a cell center determination criterion, a cell center determination result for the cell group" can be implemented in the following way:

in a case that a configuration mode for the cell center determination criterion is based on serving cell configuration, the terminal determines the cell center determination result of the terminal for each cell group based on a measurement result for a first or latest serving cell configured with the cell center determination criterion;

the terminal determines the cell center determination result of the terminal for each cell group based on a measurement result for a primary cell PCell or a primary secondary cell PSCell in the cell group; or the terminal determines the cell center determination result of the terminal for each cell group based on a measurement result for each serving cell in the cell group.

Optionally, in a case that a configuration mode for the cell center determination criterion is based on serving cell configuration, for any cell group, determination of the cell center determination result of the terminal for the cell group is similar to determination of the low mobility state determination result of the terminal for the cell group, and details are not repeated herein.

In the foregoing embodiment, the terminal can determine, based on the configuration mode for the low mobility state determination criterion sent by the network-side device, measurement results for which serving cells in the cell group and a cell center determination result of the terminal for the cell group, with low processing complexity.

Optionally, in a case that a configuration mode for the cell center determination criterion is based on serving cell configuration, for the case that "the terminal determines the low mobility state determination result of the terminal for the cell group based on a measurement result for a primary cell PCell or a primary secondary cell PSCell in the cell group", the performing measurement relaxation based on the low mobility state determination result of the terminal for the cell group can be implemented in the following way:

the terminal determines the cell center determination result of the terminal for the cell group based on a measurement result for a secondary cell SCell used for beam failure detection BFD measurement; and the terminal performs BFD measurement relaxation in a serving cell in the cell group based on the low mobility state determination result of the terminal for the cell group and the cell center determination result of the terminal for the cell group.

Optionally, for a secondary cell SCell in the cell group, whether the terminal needs to perform BFD measurement in that SCell; and if yes, the terminal determines a cell center determination result of the terminal for the cell group based on a measurement result for that SCell, and based on a low mobility state determination result and cell center determination result of the terminal for the cell group, determines whether to perform BFD measurement relaxation in the serving cell in the cell group, where the low mobility state determination result is determined based on a measurement result of a primary cell PCell or a primary secondary cell PSCell in the cell group.

Assuming that the secondary cell SCell belongs to a third band of the cell group, the terminal cannot determine, based on measurement results of other SCells of the third band or SCells of other bands of the cell group, whether BFD measurement relaxation is performed in the serving cell in the cell group.

In the foregoing embodiment, for the BFD measurement relaxation, the cell center determination result of the terminal for the cell group may be determined based on the measurement result of the SCell used for determining BFD measurement, and measurement relaxation is determined to be performed based on the low mobility state determination result of the terminal for the cell group, which reduces the measurement overheads while making the cell in which measurement relaxation is performed more targeted.

In this embodiment of this application, the measurement relaxation method further includes:

in a case that the terminal in an idle state has determined that the terminal is in a low mobility state in the cell group, upon entering the connected state, determining, by the terminal, that the low mobility state determination result is being in a low mobility state, and sending the low mobility state determination result to the network-side device.

Optionally, if the terminal has performed relevant measurement based on the idle state in a frequency point of a primary cell PCell or a primary secondary cell PSCell or a secondary cell (SCell), for example, for a DC scenario or an SCell scenario, the measurement may be an early measurement (early measurement) and the terminal has, based on the low mobility state determination criterion in the idle state, determined that it is in the low mobility state in the idle state, the terminal being in a low mobility state may be reused to the connected state, optionally, the terminal is in both the low mobility state and the connected state, and after entering the connected state, the terminal reports a case of being in the low mobility state to the network-side device.

In the foregoing embodiment, the result that the terminal is in the low mobility state, which has been determined in the idle state, is carried over to the connected state, and the terminal does not need to make a determination based on the measurement result, which reduces the unnecessary processing, thereby reducing the power consumption of the terminal and saving the processing time.

In this embodiment of this application, the measurement relaxation method further includes:

during a determination cycle configured by the network-side device, determining, by the terminal, whether the low mobility determination result of the terminal for the cell group is being in a low mobility state;

in a case that the low mobility determination result of the terminal for the cell group is not being in a low mobility state, stopping performing, by the terminal, measurement relaxation in the cell group.

Optionally, in a case that the low mobility determination result of the terminal for the cell group is being in a low mobility state, the measurement relaxation method further includes:

determining, by the terminal, whether the terminal is at the cell center of the cell group; and in a case that the terminal is not at the cell center of the cell group, stopping performing, by the terminal, measurement relaxation in the cell group.

The determination cycle for the low mobility state may be a paging cycle configured by a network, or may be another value configured by a network.

Optionally, during the measurement relaxation performed, the terminal continuously determines whether the low mobility state is satisfied. If the low mobility state is not satisfied, the terminal exits a measurement relaxation state, and additionally determines, based on a current measurement result, whether to exit the measurement relaxation state due to the non-satisfaction of the cell center determination criterion.

Optionally, if the terminal determines that the low mobility state is no longer satisfied, it may report to the network-side device whether it is currently in the low mobility state or whether it is at the cell center.

In this embodiment of this application, the cell center determination criterion may be predefined or implicitly configured, for any serving cell in each cell group, the terminal determines, according to first indication information from a network-side device, that the cell center determination criterion of the terminal for the serving cell is in effect.

For example, whether the cell center determination criterion is in effect is indicated using a 1-bit indicator.

Optionally, the configuration mode for the cell center determination criterion may alternatively be determined based on a configuration mode for the first indication information. For example, if the configuration mode for the first indication information is based on terminal configuration, the configuration mode for the cell center determination criterion is also based on the terminal configuration; if the configuration mode for the first indication information is based on serving cell configuration, the configuration mode for the cell center determination criterion is also based on the serving cell configuration; and if the configuration mode for the first indication information is based on cell group configuration, the configuration mode for the cell center determination criterion is also based on the cell group configuration.

In the foregoing embodiment, the terminal may determine, according to indication information sent by the network-side device, whether the cell center determination criterion is in effect, or determine a configuration mode for the cell center determination criterion based on a configuration mode for indication information, and thus determine the cell center determination result of the terminal for the cell group based on measurement results of which serving cells in the cell group, with low processing complexity.

For example, for the low mobility state determination criterion based on the terminal configuration, for example, in a connected-state CA/DC scenario, the measurement relaxation method includes the following steps:

Step 1a. Receive a relevant parameter of the low mobility state determination criterion configured by the network-side device, for example, duration TSearchDeltaP, threshold SSearchDeltaP, and determination cycle, and a relevant parameter of the cell center determination criterion, for example, threshold.

Optionally, the relevant parameter of the cell center determination criterion may not be configured or may be configured implicitly. For example, the terminal determines, based on indication information of whether the cell center determination criterion is in effect, whether it is necessary to determine whether the cell center determination criterion is satisfied for a cell in a CG in which RLM or BFD or RRM measurement is performed; and if it is necessary to perform the determination, the terminal determines a relevant parameter of its cell center determination criterion on its own.

In the terminal configuration-based configuration mode, the low mobility state determination criterion configured may be in effect for all CGs. For example, in a case that UE can find an NR system information block (SIB), in other words, in a case that an NR primary cell PCell exists, the low mobility state determination criterion may be directly configured in SIB2. The network-side device can alternatively configure the low mobility state determination criterion in certain signaling (for example, radio resource control (RRC) connection establishment signaling). In a case that no NR SIB can be found in NR, in other words, in a case that no NR primary cell PCell exists, the low mobility state determination criterion is configured in some signaling (for example, radio resource control (RRC) signaling) loaded by an NR secondary cell group (SCG). In this case, the network-side device can configure the low mobility state determination criterion in only signaling for the first time of configuring an NR SCG.

If the low mobility state determination criterion is configured to take effect for all CGs, whether RLM/BFD measurement needs to be performed in a serving cell is determined based on other information, and whether RLM/BFD measurement relaxation can be performed in a cell in which measurement needs to be performed is determined based on the cell center determination criterion. These cells in which RLM/BFD measurement needs to be performed include at least all PCells and PSCells and also include some SCells in which BFD measurement needs to be performed.

Optionally, the measurement relaxation may also include RRM measurement relaxation. Because RRM measurement needs to be performed in all serving cells, if the low mobility state determination criterion is configured to be in effect for all CGs, the terminal may determine, based on the configured or predefined cell center determination criterion, whether measurement relaxation can be performed in each serving cell.

Optionally, the network-side device may indicate, in a serving cell, whether RLM/BFD/RRM measurement relaxation can be performed in that serving cell, by using indication information, for example, by configuring a 1-bit indicator in the indication information. For example, when the indicator is set to 1, it indicates that RLM/BFD/RRM measurement relaxation is not to be performed in the cell.

Based on the configuration of the low mobility state determination criterion, which is in effect for all CGs, and measurement relaxation indication, which is in effect for only a serving cell, the network can more flexibly control the measurement relaxation behavior of the terminal in certain specific cells, so as to ensure the performance of the terminal.

Step 2a. The terminal starts to determine, in a corresponding serving cell based on the low mobility state determination criterion configured by the network-side device, a measurement result for the serving cell, determines a low mobility state determination result, and determines a cell center determination result based on the cell center determination criterion. Refer to the foregoing embodiment.

Optionally, if the terminal determines that RLM/BFD/RRM measurement relaxation can be performed in a primary cell PCell or a primary secondary cell PSCell in the CG, RLM/BFD/RRM measurement relaxation is also performed in a secondary cell SCell.

Optionally, if a CG includes different cells of multiple bands, in a band including the primary cell PCell or the primary secondary cell PSCell, the terminal determines, based on a measurement result for a primary cell PCell or a primary secondary cell PSCell, whether RLM/BFD/RRM measurement relaxation needs to be performed in a cell of this band; and in a band including no primary cell PCell or no primary secondary cell PSCell, the terminal determines, based on a measurement result for an SCell, whether RLM/BFD/RRM measurement relaxation is performed.

Optionally, in a band including no PCell or no PSCell, the terminal merely determines, based on a measurement result for an SCell, whether the cell center determination criterion is satisfied, optionally, whether it is at the cell center, and then determines, based on a low mobility state determination result corresponding to a PCell or a PSCell in the same CG, whether RLM/BFD/RRM measurement relaxation is performed.

Optionally, if a determination result for an MCG is that RLM/BFD/RRM measurement relaxation can be performed, RLM/BFD/RRM measurement relaxation is performed for all CGs; and if a determination result for only one or more SCGs is that RLM/BFD/RRM measurement relaxation can be performed, RLM/BFD/RRM measurement relaxation is performed in only an SCG in which measurement relaxation can be determined to be performed; and if a determination result for an MCG is that RLM/BFD/RRM measurement relaxation can be performed, RLM/BFD/RRM measurement relaxation can also be performed provided that an SCG is determined to satisfy the cell center determination criterion; and if a determination result for an MCG is that RLM/BFD/RRM measurement relaxation cannot be performed, the SCG must satisfy both the cell center determination criterion and the low mobility state determination criterion before RLM/BFD/RRM measurement relaxation can be performed.

Step 3a: After determining to perform measurement relaxation, the terminal enters a corresponding measurement relaxation state, continuously determines, according to a configuration requirement of determination cycle for low mobility state, whether it meets the low mobility state, and exits the measurement relaxation state if it does not meet the low mobility state; and in addition, the terminal also determines, based on the current measurement result, whether it needs to exit the measurement relaxation state because it does not meet the cell center determination criterion.

Step 4a. The terminal exits the measurement relaxation state and returns to step 2a for continuous determination.

For example, for the low mobility state determination criterion based on the cell group configuration, for example, in a connected-state CA/DC scenario, the measurement relaxation method includes the following steps:

Step 1b. Receive a relevant parameter of the low mobility state determination criterion configured by the network-side device, for example, duration TSearchDeltaP, threshold SSearchDeltaP, and determination cycle, and a relevant parameter of the cell center determination criterion, for example, threshold.

Optionally, the relevant parameter of the cell center determination criterion may not be configured or may be configured implicitly. For example, the terminal determines, based on indication information of whether the cell center determination criterion is in effect, whether it is necessary to determine whether the cell center determination criterion is satisfied for a cell in a CG in which RLM or BFD or RRM measurement is performed; and if it is necessary to perform the determination, the terminal determines a relevant parameter of its cell center determination criterion on its own.

In a configuration mode based on cell group configuration, the low mobility state determination criterion may be that a relevant parameter is configured in a CG configuration, and thus is in effect for only the current CG. Optionally, the CG configured can only be a CG in NR and cannot be a CG in LTE.

The terminal may determine, based on a measurement result for a PSCell in the NR SCG, whether it is in a low mobility state, and thus apply the determination result to all serving cells in the SCG; or the terminal may determine a low mobility state based on a measurement result for each serving cell.

In the CG configured with the low mobility state determination criterion, the terminal determines, based on other information, whether RLM/BFD measurement needs to be performed in a serving cell, and determines, based on the cell center determination criterion, whether RLM/BFD measurement relaxation can be performed in a cell in which measurement needs to be performed. These cells in which RLM/BFD measurement needs to be performed include at least all PCells and PSCells and also include some SCells in which BFD measurement needs to be performed.

Optionally, the network-side device may indicate, in a serving cell, whether RLM/BFD/RRM measurement relaxation can be performed in that serving cell, by using indication information, for example, by configuring a 1-bit indicator in the indication information. For example, when the indicator is set to 1, it indicates that RLM/BFD/RRM measurement relaxation is not to be performed in the cell.

Based on the configuration of the low mobility state determination criterion, which is in effect for all CGs, and measurement relaxation indication, which is in effect for only a serving cell, the network can more flexibly control the measurement relaxation behavior of the terminal in certain specific cells, so as to ensure the performance of the terminal.

Step 2b. The terminal starts to determine, in a corresponding serving cell based on the low mobility state determination criterion configured by the network-side device, a measurement result for the serving cell, determines a low mobility state determination result, and determines a cell center determination result based on the cell center determination criterion. Refer to the foregoing embodiment.

Optionally, if the terminal determines that RLM/BFD/RRM measurement relaxation can be performed in a primary cell PCell or a primary secondary cell PSCell in the CG, RLM/BFD/RRM measurement relaxation is also performed in a secondary cell SCell.

Optionally, if a CG includes different cells of multiple bands, in a band including the primary cell PCell or the primary secondary cell PSCell, the terminal determines, based on a measurement result for a primary cell PCell or a primary secondary cell PSCell, whether RLM/BFD/RRM measurement relaxation needs to be performed in a cell of this band; and in a band including no primary cell PCell or no primary secondary cell PSCell, the terminal determines, based on a measurement result for an SCell, whether RLM/BFD/RRM measurement relaxation is performed.

Optionally, in a band including no PCell or no PSCell, the terminal merely determines, based on a measurement result for an SCell, whether the cell center determination criterion is satisfied, optionally, whether it is at the cell center, and then determines, based on a low mobility state determination result corresponding to a PCell or a PSCell in the same CG, whether RLM/BFD/RRM measurement relaxation is performed.

Optionally, if a determination result for an MCG is that RLM/BFD/RRM measurement relaxation can be performed, RLM/BFD/RRM measurement relaxation is performed for all CGs; and if a determination result for only one or more SCGs is that RLM/BFD/RRM measurement relaxation can be performed, RLM/BFD/RRM measurement relaxation is performed in only an SCG in which measurement relaxation can be determined to be performed; and if a determination result for an MCG is that RLM/BFD/RRM measurement relaxation can be performed, RLM/BFD/RRM measurement relaxation can also be performed provided that an SCG is determined to satisfy the cell center determination criterion; and if a determination result for an MCG is that RLM/BFD/RRM measurement relaxation cannot be performed, the SCG must satisfy both the cell center determination criterion and the low mobility state determination criterion before RLM/BFD/RRM measurement relaxation can be performed.

Step 3b: After determining to perform measurement relaxation, the terminal enters a corresponding measurement relaxation state, continuously determines, according to a configuration requirement of determination cycle for low mobility state, whether it meets the low mobility state, and exits the measurement relaxation state if it does not meet the low mobility state; and in addition, the terminal also determines, based on the current measurement result, whether it needs to exit the measurement relaxation state because it does not meet the cell center determination criterion.

Step 4b. The terminal exits the measurement relaxation state and returns to step 2b for continuous determination.

For example, for the low mobility state determination criterion based on the serving cell configuration, for example, in a connected-state CA/DC scenario, the measurement relaxation method includes the following steps:

Step 1c. Receive a relevant parameter of the low mobility state determination criterion configured by the network-side device, for example, duration TSearchDeltaP, threshold SSearchDeltaP, and determination cycle, and a relevant parameter of the cell center determination criterion, for example, threshold.

Optionally, the relevant parameter of the cell center determination criterion may not be configured or may be configured implicitly. For example, the terminal determines, based on indication information of whether the cell center determination criterion is in effect, whether it is necessary to determine whether the cell center determination criterion is satisfied for a cell in a CG in which RLM or BFD or RRM measurement is performed; and if it is necessary to perform the determination, the terminal determines a relevant parameter of its cell center determination criterion on its own.

In a configuration mode based on serving cell configuration, the low mobility state determination criterion may be that a relevant parameter is configured in a configuration for each serving cell, and thus is in effect for only the current serving cell. Optionally, the serving cell configured can only be a serving cell in NR and cannot be a serving cell in LTE.

Optionally, in each CG, the terminal determines whether measurement relaxation can be performed in a first or latest serving cell configured with the low mobility state determination criterion. Optionally, it can alternatively define that the network-side device can configure the low mobility state determination criterion for only a cell in which RLM and/or BFD needs to be performed, in other words, the terminal determines whether measurement relaxation can be performed in a PCell and a PSCell in the CG and in a SCell in which BFD measurement needs to be performed.

In the serving cell configured with the low mobility state determination criterion, UE determines, based on other information, whether RLM/BFD measurement needs to be performed in a serving cell, and determines, based on the cell center determination criterion, whether RLM/BFD measurement relaxation can be performed in a cell in which measurement needs to be performed. These cells in which RLM/BFD measurement needs to be performed include at least all PCells and PSCells and also include some SCells in which BFD measurement needs to be performed.

The terminal determining whether measurement relaxation can be performed in an SCell in the CG in which BFD measurement needs to be performed means, for example, that if only one of SCells of a band is configured to be able to perform BFD measurement relaxation, the terminal may choose to perform measurement in that SCell and relax BFD measurement when meeting the conditions. If the terminal performs BFD measurement in another SCell of this band or in an SCell of another band, the terminal can assume that BFD measurement relaxation cannot be performed in the another SCell of this band or in the SCell of another band.

Step 2c. The terminal starts to determine, in a corresponding serving cell based on the low mobility state determination criterion configured by the network-side device, a measurement result for the serving cell, determines a low mobility state determination result, and determines a cell center determination result based on the cell center determination criterion. Refer to the foregoing embodiment.

If the network-side device has configured that the terminal is required to report a determination result, the terminal needs to report at least one of the following to the network-side device in a corresponding CG: a low mobility state determination result, a cell center determination result, or whether to perform measurement relaxation.

Optionally, if the terminal determines that RLM/BFD/RRM measurement relaxation can be performed in a primary cell PCell or a primary secondary cell PSCell in the CG, RLM/BFD/RRM measurement relaxation is also performed in a secondary cell SCell.

Optionally, if a CG includes different cells of multiple bands, in a band including the primary cell PCell or the primary secondary cell PSCell, the terminal determines, based on a measurement result for a primary cell PCell or a primary secondary cell PSCell, whether RLM/BFD/RRM measurement relaxation needs to be performed in a cell of this band; and in a band including no primary cell PCell or no primary secondary cell PSCell, the terminal determines, based on a measurement result for an SCell, whether RLM/BFD/RRM measurement relaxation is performed.

Optionally, in a band including no PCell or no PSCell, the terminal merely determines, based on a measurement result for an SCell, whether the cell center determination criterion is satisfied, optionally, whether it is at the cell center, and then determines, based on a low mobility state determination result corresponding to a PCell or a PSCell in the same CG, whether RLM/BFD/RRM measurement relaxation is performed.

Optionally, if a determination result for an MCG is that RLM/BFD/RRM measurement relaxation can be performed, RLM/BFD/RRM measurement relaxation is performed for all CGs; and if a determination result for only one or more SCGs is that RLM/BFD/RRM measurement relaxation can be performed, RLM/BFD/RRM measurement relaxation is performed in only an SCG in which measurement relaxation can be determined to be performed; and if a determination result for an MCG is that RLM/BFD/RRM measurement relaxation can be performed, RLM/BFD/RRM measurement relaxation can also be performed provided that an SCG is determined to satisfy the cell center determination criterion; and if a determination result for an MCG is that RLM/BFD/RRM measurement relaxation cannot be performed, the SCG must satisfy both the cell center determination criterion and the low mobility state determination criterion before RLM/BFD/RRM measurement relaxation can be performed.

Step 3c: After determining to perform measurement relaxation, the terminal enters a corresponding measurement relaxation state, continuously determines, according to a configuration requirement of determination cycle for low mobility state, whether it meets the low mobility state, and exits the measurement relaxation state if it does not meet the low mobility state; and in addition, the terminal also determines, based on the current measurement result, whether it needs to exit the measurement relaxation state because it does not meet the cell center determination criterion.

Step 4c. The terminal exits the measurement relaxation state and returns to step 2c for continuous determination.

Figure 4:
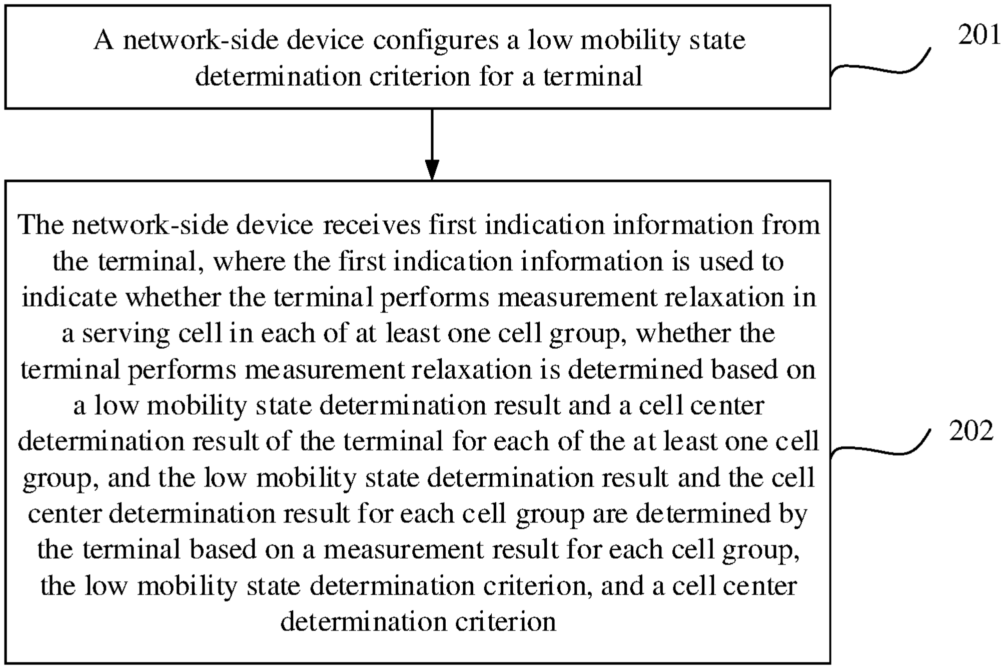
FIG. 4 is a second schematic flowchart of a measurement relaxation method according to an embodiment of this application.

FIG. 4 is a second schematic flowchart of a measurement relaxation method according to an embodiment of this application. As shown in FIG. 3 and FIG. 4, the measurement relaxation method provided in this embodiment includes the following steps.

Step 201: A network-side device configures a low mobility state determination criterion for a terminal.

Step 202. The network-side device receives first indication information from the terminal, where the first indication information is used to indicate whether the terminal performs measurement relaxation in a serving cell in each of at least one cell group, whether the terminal performs measurement relaxation is determined based on a low mobility state determination result and a cell center determination result of the terminal for each of the at least one cell group, and the low mobility state determination result and cell center determination result for each cell group are determined by the terminal based on a measurement result for each cell group, the low mobility state determination criterion, and a cell center determination criterion.

Optionally, the network-side device may configure the low mobility state determination criterion based on a terminal, a serving cell, or a cell group, and the terminal determines a low mobility state based on the configured low mobility state determination criterion and a measurement result, determines, based on a measurement result for the cell group and a cell center determination criterion, whether it is at the cell center, and thus determines whether measurement relaxation is performed in a serving cell in the cell group.

Step 201 and step 202 do not have a qualifying relationship.

Step 201 is similar to step 100 in FIG. 3, and optionally may include step 103: the terminal reports to the network-side device whether the terminal performs measurement relaxation in a serving cell in each cell group.

The method of the network-side device and the method of the terminal side have similar implementation principles and technical effects. Details are not repeated herein.

In the method of this embodiment, the terminal determines, based on the measurement result for each of the at least one cell group, the low mobility state determination criterion, and the cell center determination criterion, the low mobility state determination result and cell center determination result for each of the at least one cell group; determines, based on the low mobility state determination result and cell center determination result for each cell group, whether measurement relaxation can be performed in the serving cell in the cell group; and performs measurement relaxation in the serving cell in each cell group. This can enable the terminal to determine, in a case of multiple serving cells configured by a network-side device, whether to perform measurement relaxation based on actual situation of each cell group or each serving cell, providing good flexibility in terms of compromise between communication performance and power saving performance.

Optionally, in a case that a configuration mode for the low mobility state determination criterion is based on terminal configuration, the low mobility state determination result of the terminal for each cell group is determined by the terminal based on a measurement result for a primary secondary cell PSCell in an NR secondary cell group SCG configured for the first time by the network-side device;

the low mobility state determination result of the terminal for each cell group is determined by the terminal based on a measurement result for a primary cell PCell or a primary secondary cell PSCell in the cell group; or the low mobility state determination result of the terminal for each cell group is determined by the terminal based on a measurement result for at least one serving cell in the cell group; and in a case that a configuration mode for the low mobility state determination criterion is based on cell group configuration, the low mobility state determination result of the terminal for each cell group is determined by the terminal based on a measurement result for a primary cell PCell or a primary secondary cell PSCell in the cell group; or the low mobility state determination result of the terminal for each cell group is determined by the terminal based on a measurement result for at least one serving cell in the cell group.

Optionally, in a case that a configuration mode for the cell center determination criterion is based on terminal configuration, the cell center determination result of the terminal for each cell group is determined by the terminal based on a measurement result for a primary secondary cell PSCell in an NR secondary cell group SCG configured for the first time by the network-side device;

the cell center determination result of the terminal for each cell group is determined by the terminal based on a measurement result for a primary cell PCell or a primary secondary cell PSCell in the cell group; or the cell center determination result of the terminal for each cell group is determined by the terminal based on a measurement result for at least one serving cell in the cell group; and in a case that a configuration mode for the cell center determination criterion is based on cell group configuration, the cell center determination result of the terminal for each cell group is determined by the terminal based on a measurement result for a primary cell PCell or a primary secondary cell PSCell in the cell group; or the cell center determination result of the terminal for each cell group is determined by the terminal based on a measurement result for at least one serving cell in the cell group.

Optionally, in a case that the cell group includes a cell of a first band and a cell of a second band, for the first band where a primary cell PCell or a primary secondary cell PSCell exists, a low mobility state determination result of the terminal in the first band is determined by the terminal based on a measurement result for the primary cell PCell or the primary secondary cell PSCell; and for the second band where no primary cell PCell or primary secondary cell PSCell exists, a low mobility state determination result of the terminal in the second band is the low mobility state determination result of the terminal in the first band.

Optionally, in a case that the cell group includes a cell of a first band and a cell of a second band, for the first band where a primary cell PCell or a primary secondary cell PSCell exists, a cell center determination result of the terminal in the first band is determined by the terminal based on a measurement result for the primary cell PCell or the primary secondary cell PSCell; and for the second band where no primary cell PCell or primary secondary cell PSCell exists, a cell center determination result of the terminal in the second band is determined by the terminal based on a measurement result for a secondary cell SCell of the second band.

Optionally, in a case that a configuration mode for the low mobility state determination criterion is based on serving cell configuration, in a case that a configuration mode for the low mobility state determination criterion is based on serving cell configuration, the low mobility state determination result of the terminal for each cell group is determined by the terminal based on a measurement result for a first or latest serving cell configured with the low mobility determination criterion;

the low mobility state determination result of the terminal for each cell group is determined by the terminal based on a measurement result for a primary cell PCell or a primary secondary cell PSCell in the cell group; or the low mobility state determination result of the terminal for each cell group is determined by the terminal based on a measurement result for at least one serving cell in the cell group.

Optionally, in a case that a configuration mode for the cell center determination criterion is based on serving cell configuration, the cell center determination result of the terminal for each cell group is determined by the terminal based on a measurement result for a first or latest serving cell configured with the cell center determination criterion;

the cell center determination result of the terminal for each cell group is determined by the terminal based on a measurement result for a primary cell PCell or a primary secondary cell PSCell in the cell group; or the cell center determination result of the terminal for each cell group is determined by the terminal based on a measurement result for each serving cell in the cell group.

Optionally, the terminal performing BFD measurement relaxation in a serving cell in the cell group is determined by the terminal based on the low mobility state determination of the terminal for the cell group and the cell center determination result of the terminal for the cell group; where the cell center determination result of the terminal for the cell group is determined by the terminal based on a measurement result for a secondary cell SCell in which beam failure detection BFD measurement relaxation is determined to be performed.

Optionally, the method further includes:

sending, by the network-side device, second indication information to the terminal, where the second indication information is used to indicate that the cell center determination criterion of the terminal for the serving cell in the cell group is in effect.

Optionally, a configuration mode for the cell center determination criterion is determined based on a configuration mode for the second indication information.

The implementation processes and technical effects in the foregoing embodiment are similar to those in the terminal-side method embodiment. Reference may be made to detailed introduction in the terminal-side embodiment. Details are not repeated herein.

It should be noted that the measurement relaxation method provided in this embodiment of this application may be executed by a measurement relaxation apparatus or a processing module for performing the measurement relaxation method in the measurement relaxation apparatus. In the embodiments of this application, assuming that the measurement relaxation apparatus performs the measurement relaxation methods, the measurement relaxation apparatus provided in the embodiments of this application is described.

Figure 5:
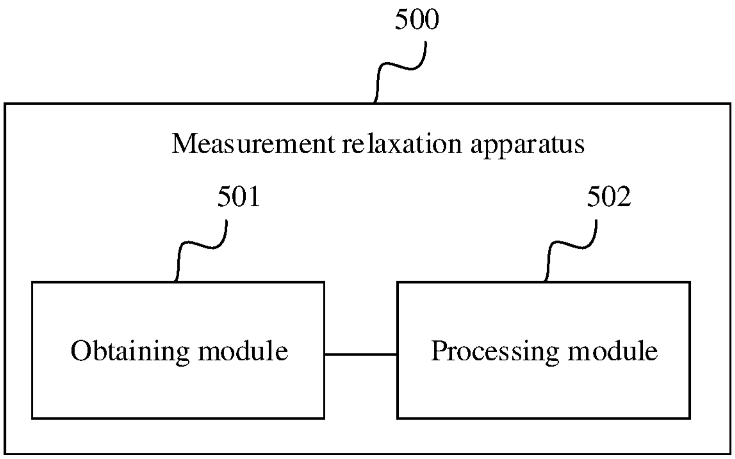
FIG. 5 is a first schematic structural diagram of a measurement relaxation apparatus according to an embodiment of this application.

FIG. 5 is a schematic structural diagram of a measurement relaxation apparatus according to this application. The measurement relaxation apparatus 500 provided in this embodiment includes:

a determining module 501, configured to determine, based on a measurement result for each of at least one cell group, a low mobility state determination criterion, and a cell center determination criterion, a low mobility state determination result and a cell center determination result for each of the at least one cell group; and a processing module 502, configured to perform measurement relaxation in a serving cell in each cell group based on the low mobility state determination result and cell center determination result for the cell group.

In the apparatus of this embodiment, the determining module determines, based on the measurement result for each of the at least one cell group, the low mobility state determination criterion, and the cell center determination criterion, the low mobility state determination result and cell center determination result for each of the at least one cell group; and the processing module determines, based on the low mobility state determination result and cell center determination result for each cell group, whether measurement relaxation can be performed in the serving cell in the cell group, and performs measurement relaxation in the serving cell in each cell group. This can enable the apparatus to determine, in a case of multiple serving cells configured by a network-side device, whether to perform measurement relaxation based on actual situation of each cell group or each serving cell, providing good flexibility in terms of compromise between communication performance and power saving performance.

Optionally, the processing module 502 is configured to:

for any cell group, in a case that the low mobility state determination result of a terminal for the cell group is being in a low mobility state and the cell center determination result of the terminal for the cell group is being at the cell center, determine to perform measurement relaxation in a serving cell in the cell group, where the cell center determination result is obtained based on a cell center determination result corresponding to at least one cell in the cell group; or for any cell group, in a case that the low mobility state determination result of the terminal for the cell group is being in a low mobility state and a cell center determination result for at least one serving cell in the cell group is being at the cell center, determine to perform measurement relaxation in each of the at least one serving cell.

Optionally, the processing module 502 is configured to:

for a master cell group MCG in the at least one cell group, in a case that measurement relaxation is determined to be performed in a serving cell in the MCG based on a low mobility state determination result and a cell center determination result for the MCG, perform measurement relaxation in serving cells in all of the at least one cell group; or in a case that measurement relaxation is determined to be performed in a secondary cell group SCG in the at least one cell group based on the low mobility state determination result and cell center determination result, perform, by the terminal, measurement relaxation in a serving cell in the SCG.

Optionally, the determining module 501 is configured to:

in a case that a configuration mode for the low mobility state determination criterion is based on terminal configuration, determine the low mobility state determination result of the terminal for each cell group based on a measurement result for a primary secondary cell PSCell in an NR secondary cell group SCG configured for the first time by a network-side device;

determine the low mobility state determination result of the terminal for each cell group based on a measurement result for a primary cell PCell or a primary secondary cell PSCell in the cell group; or determine the low mobility state determination result of the terminal for each cell group based on a measurement result for at least one serving cell in the cell group; and in a case that a configuration mode for the low mobility state determination criterion is based on cell group configuration, determine the low mobility state determination result of the terminal for each cell group based on a measurement result for a primary cell PCell or a primary secondary cell PSCell in the cell group; or determine the low mobility state determination result of the terminal for each cell group based on a measurement result for at least one serving cell in the cell group.

Optionally, the determining module 501 is configured to:

in a case that a configuration mode for the cell center determination criterion is based on terminal configuration, determine the cell center determination result of the terminal for each cell group based on a measurement result for a primary secondary cell PSCell in an NR secondary cell group SCG configured for the first time by a network-side device; or determine the cell center determination result of the terminal for each cell group based on a measurement result for a primary cell PCell or a primary secondary cell PSCell in the cell group; or determine the cell center determination result of the terminal for each cell group based on a measurement result for at least one serving cell in the cell group; and in a case that a configuration mode for the cell center determination criterion is based on cell group configuration, determine the cell center determination result of the terminal for each cell group based on a measurement result for a primary cell PCell or a primary secondary cell PSCell in the cell group; or determine the cell center determination result of the terminal for each cell group based on a measurement result for at least one serving cell in the cell group.

Optionally, the determining module 501 is configured to:

in a case that the cell group includes a cell of a first band and a cell of a second band, for the first band where a primary cell PCell or a primary secondary cell PSCell exists, determine a low mobility state determination result of the terminal in the first band based on a measurement result for the primary cell PCell or the primary secondary cell PSCell; and for the second band where no primary cell PCell or primary secondary cell PSCell exists, determine the low mobility state determination result of the terminal in the first band as a low mobility state determination result of the terminal in the second band.

Optionally, the determining module 501 is configured to:

in a case that the cell group includes a cell of a first band and a cell of a second band, for the first band where a primary cell PCell or a primary secondary cell PSCell exists, determine a cell center determination result of the terminal in the first band based on a measurement result for the primary cell PCell or the primary secondary cell PSCell; and for the second band where no primary cell PCell or primary secondary cell PSCell exists, determine a cell center determination result of the terminal in the second band based on a measurement result for a secondary cell SCell of the second band.

Optionally, the determining module 501 is configured to:

in a case that a configuration mode for the low mobility state determination criterion is based on serving cell configuration, determine the low mobility state determination result of the terminal for each cell group based on a measurement result for a first or latest serving cell configured with the low mobility state determination criterion; or determine the low mobility state determination result of the terminal for each cell group based on a measurement result for a primary cell PCell or a primary secondary cell PSCell in the cell group; or determine the low mobility state determination result of the terminal for each cell group based on a measurement result for at least one serving cell in the cell group.

Optionally, the determining module 501 is configured to:

in a case that a configuration mode for the cell center determination criterion is based on serving cell configuration, determine the cell center determination result of the terminal for each cell group based on a measurement result for a first or latest serving cell configured with the cell center determination criterion;

determine the cell center determination result of the terminal for each cell group based on a measurement result for a primary cell PCell or a primary secondary cell PSCell in the cell group; or determine the cell center determination result of the terminal for each cell group based on a measurement result for at least one serving cell in the cell group.

Optionally, the processing module 502 is configured to:

determine the cell center determination result of the terminal for the cell group based on a measurement result for a secondary cell SCell used for beam failure detection BFD measurement; and perform BFD measurement relaxation in a serving cell in the cell group based on the low mobility state determination result of the terminal for the cell group and the cell center determination result of the terminal for the cell group.

Optionally, the determining module 501 is further configured to:

for any serving cell in each cell group, determine, according to first indication information from a network-side device, that the cell center determination criterion of the terminal for the serving cell is in effect.

Optionally, the low mobility state determination criterion is configured by a network-side device; or the low mobility state determination criterion and the cell center determination criterion are both configured by a network-side device.

Optionally, in a case that the low mobility state determination criterion is configured by a network-side device, if a configuration mode for the low mobility state determination criterion is based on terminal configuration, a configuration mode for the cell center determination criterion is based on terminal configuration;

if a configuration mode for the low mobility state determination criterion is based on cell group configuration, a configuration mode for the cell center determination criterion is based on cell group configuration; and if a configuration mode for the low mobility state determination criterion is based on serving cell configuration, a configuration mode for the cell center determination criterion is based on serving cell configuration.

Optionally, a configuration mode for the cell center determination criterion is determined based on a configuration mode for the first indication information.

The implementation processes and technical effects in the foregoing embodiment are similar to those in the terminal-side method embodiment. Reference may be made to detailed introduction in the terminal-side embodiment. Details are not repeated herein.

Figure 6:
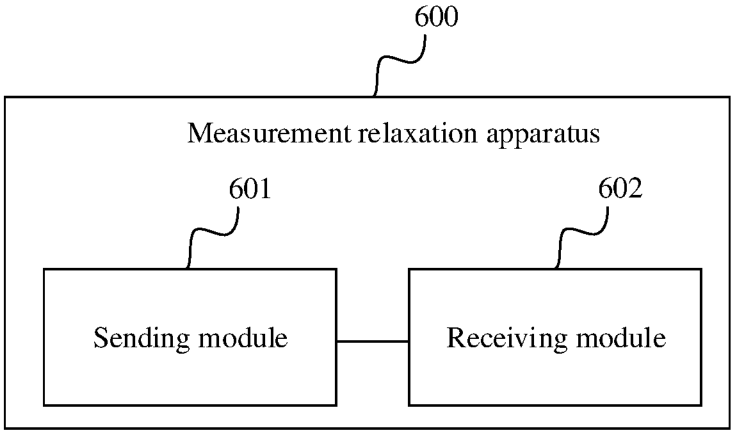
FIG. 6 is a second schematic structural diagram of a measurement relaxation apparatus according to an embodiment of this application.

FIG. 6 is a schematic structural diagram of a measurement relaxation apparatus according to this application. The measurement relaxation apparatus 600 provided in this embodiment includes:

a sending module 601, configured to configure a low mobility state determination criterion for a terminal; and a receiving module 602, configured to receive first indication information from the terminal, where the first indication information is used to indicate whether the terminal performs measurement relaxation in a serving cell in each of at least one cell group, whether the terminal performs measurement relaxation is determined based on a low mobility state determination result and a cell center determination result of the terminal for each cell group, and the low mobility state determination result and cell center determination result for each cell group are determined by the terminal based on a measurement result for each cell group, the low mobility state determination criterion, and a cell center determination criterion.

In the apparatus of this embodiment, the terminal determines, based on the measurement result for each of the at least one cell group, the low mobility state determination criterion, and the cell center determination criterion, the low mobility state determination result and cell center determination result for each of the at least one cell group; determines, based on the low mobility state determination result and cell center determination result for each cell group, whether measurement relaxation can be performed in the serving cell in the cell group, and performs measurement relaxation in the serving cell in each cell group. This can enable the terminal to determine, in a case of multiple serving cells configured by a network-side device, whether to perform measurement relaxation based on actual situation of each cell group or each serving cell, providing good flexibility in terms of compromise between communication performance and power saving performance.

Optionally, in a case that a configuration mode for the low mobility state determination criterion is based on terminal configuration, the low mobility state determination result of the terminal for each cell group is determined by the terminal based on a measurement result for a primary secondary cell PSCell in an NR secondary cell group SCG configured for the first time by the network-side device;

the low mobility state determination result of the terminal for each cell group is determined by the terminal based on a measurement result for a primary cell PCell or a primary secondary cell PSCell in the cell group; or the low mobility state determination result of the terminal for each cell group is determined by the terminal based on a measurement result for at least one serving cell in the cell group; and in a case that a configuration mode for the low mobility state determination criterion is based on cell group configuration, the low mobility state determination result of the terminal for each cell group is determined by the terminal based on a measurement result for a primary cell PCell or a primary secondary cell PSCell in the cell group; or the low mobility state determination result of the terminal for each cell group is determined by the terminal based on a measurement result for at least one serving cell in the cell group.

Optionally, in a case that a configuration mode for the cell center determination criterion is based on terminal configuration, the cell center determination result of the terminal for each cell group is determined by the terminal based on a measurement result for a primary secondary cell PSCell in a secondary cell group SCG configured for the first time by the network-side device;

the cell center determination result of the terminal for each cell group is determined by the terminal based on a measurement result for a primary cell PCell or a primary secondary cell PSCell in the cell group; or the cell center determination result of the terminal for each cell group is determined by the terminal based on a measurement result for at least one serving cell in the cell group; and in a case that a configuration mode for the cell center determination criterion is based on cell group configuration, the cell center determination result of the terminal for each cell group is determined by the terminal based on a measurement result for a primary cell PCell or a primary secondary cell PSCell in the cell group; or the cell center determination result of the terminal for each cell group is determined by the terminal based on a measurement result for at least one serving cell in the cell group.

Optionally, in a case that the cell group includes a cell of a first band and a cell of a second band, for the first band where a primary cell PCell or a primary secondary cell PSCell exists, a low mobility state determination result of the terminal in the first band is determined by the terminal based on a measurement result for the primary cell PCell or the primary secondary cell PSCell; and for the second band where no primary cell PCell or primary secondary cell PSCell exists, a low mobility state determination result of the terminal in the second band is the low mobility state determination result of the terminal in the first band.

Optionally, in a case that the cell group includes a cell of a first band and a cell of a second band, for the first band where a primary cell PCell or a primary secondary cell PSCell exists, a cell center determination result of the terminal in the first band is determined by the terminal based on a measurement result for the primary cell PCell or the primary secondary cell PSCell; and for the second band where no primary cell PCell or primary secondary cell PSCell exists, a cell center determination result of the terminal in the second band is determined by the terminal based on a measurement result for a secondary cell SCell of the second band.

Optionally, in a case that a configuration mode for the low mobility state determination criterion is based on serving cell configuration, the low mobility state determination result of the terminal for each cell group is determined by the terminal based on a measurement result for a first or latest serving cell configured with the low mobility determination criterion;

the low mobility state determination result of the terminal for each cell group is determined by the terminal based on a measurement result for a primary cell PCell or a primary secondary cell PSCell in the cell group; or the low mobility state determination result of the terminal for each cell group is determined by the terminal based on a measurement result for at least one serving cell in the cell group.

Optionally, in a case that a configuration mode for the cell center determination criterion is based on serving cell configuration, the cell center determination result of the terminal for each cell group is determined by the terminal based on a measurement result for a first or latest serving cell configured with the cell center determination criterion;

the cell center determination result of the terminal for each cell group is determined by the terminal based on a measurement result for a primary cell PCell or a primary secondary cell PSCell in the cell group; or the cell center determination result of the terminal for each cell group is determined by the terminal based on a measurement result for each serving cell in the cell group.

Optionally, the terminal performing beam failure detection BFD measurement relaxation in a serving cell in the cell group is determined by the terminal based on the low mobility state determination of the terminal for the cell group and the cell center determination result of the terminal for the cell group; where the cell center determination result of the terminal for the cell group is determined by the terminal based on a measurement result for a secondary cell SCell in which BFD measurement relaxation is to be performed.

Optionally, the sending module 601 is further configured to:

send second indication information to the terminal, where the second indication information is used to indicate that the cell center determination criterion of the terminal for the serving cell in the cell group is in effect.

Optionally, a configuration mode for the cell center determination criterion is determined based on a configuration mode for the first indication information.

The implementation processes and technical effects in the foregoing embodiment are similar to those in the method embodiment of the network-side device. Reference may be made to detailed introduction in the method embodiment. Details are not repeated herein.

The measurement relaxation apparatus in this embodiment of this application may be an apparatus, an apparatus or electronic device with an operating system, or a component, integrated circuit, or chip in a terminal. The apparatus or electronic device may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine or the like, which is not specifically limited in the embodiments of this application.

The measurement relaxation apparatus provided in this embodiment of this application can implement each process implemented by the method embodiments in FIG. 2 to FIG. 4, with the same technical effect achieved. To avoid repetition, details are not described herein again.

Figure 7:
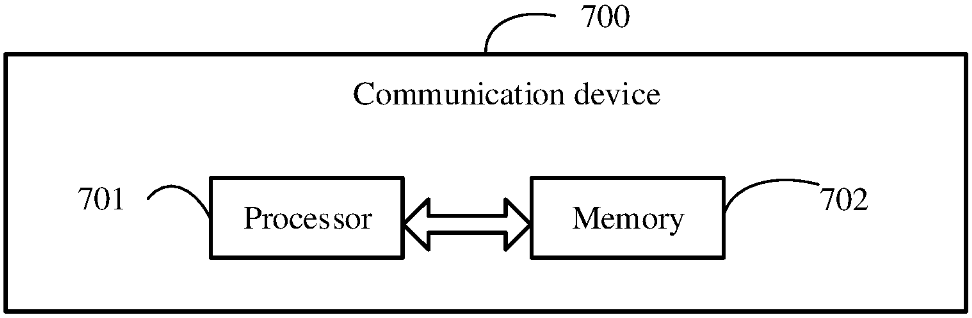
FIG. 7 is a schematic structural diagram of a communication device according to an embodiment of this application.

Optionally, as shown in FIG. 7, an embodiment of this application further provides a communication device 700 including a processor 701, a memory 702, and a program or instructions stored in the memory 702 and capable of running on the processor 701. For example, in a case that the communication device 700 is a terminal, when the program or instructions are executed by the processor 701, the processes of the foregoing embodiment of the measurement relaxation method are implemented, with the same technical effects achieved. In a case that the communication device 700 is a network-side device, when the program or instructions are executed by the processor 701, the processes of the foregoing measurement relaxation method embodiment are implemented, with the same technical effects achieved. To avoid repetition, details are not described herein again.

Figure 8:
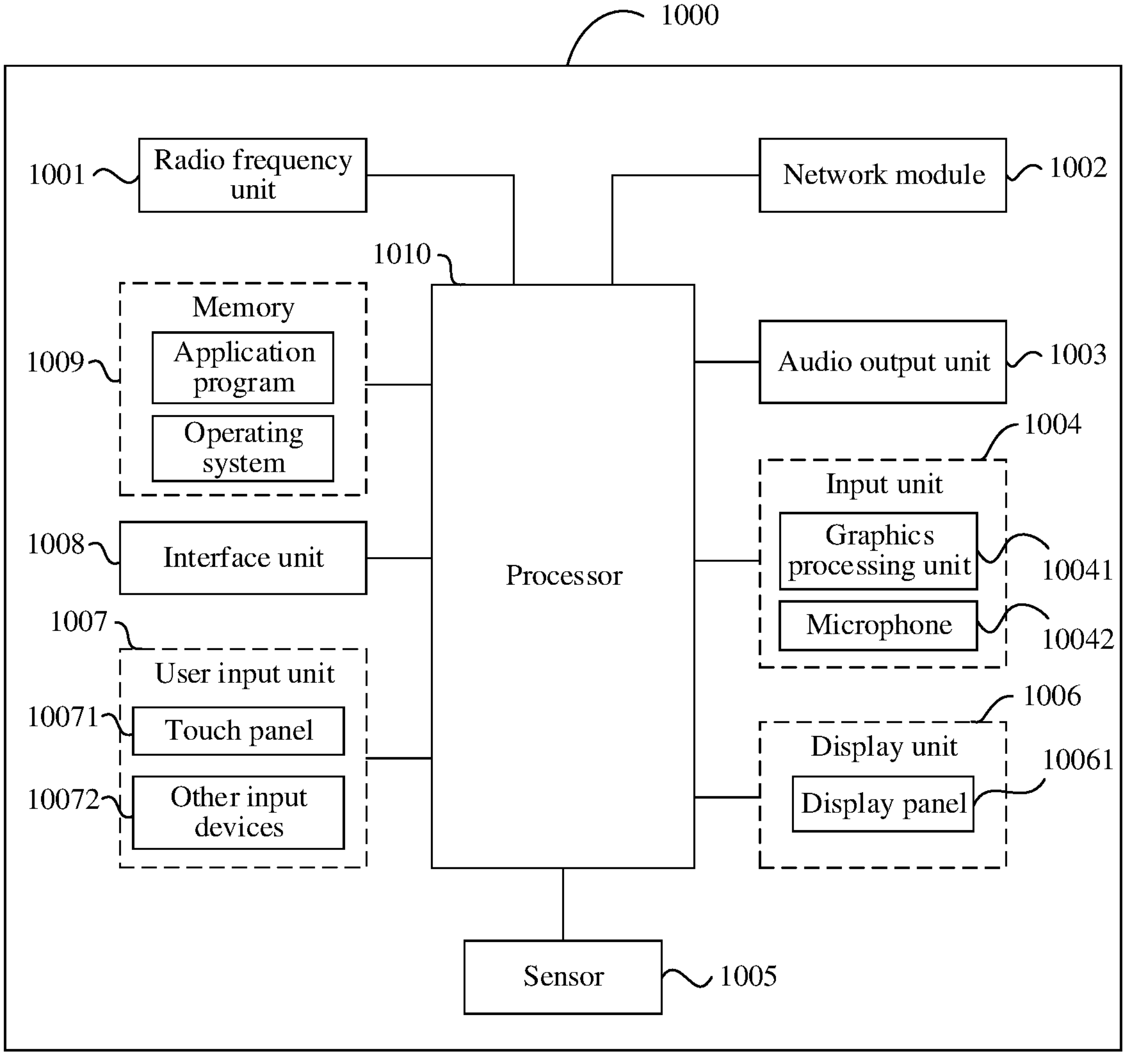
FIG. 8 is a schematic diagram of a hardware structure of a terminal according to an embodiment of this application.

An embodiment of this application further provides a terminal. The terminal includes a processor and a communication interface. The processor is configured to determine, based on a measurement result for each of at least one cell group, a low mobility state determination criterion, and a cell center determination criterion, a low mobility state determination result and a cell center determination result for each of the at least one cell group; and perform measurement relaxation in a serving cell in each cell group based on the low mobility state determination result and cell center determination result for the cell group. The communication interface is configured to obtain a measurement result of each of the at least one cell group. This terminal embodiment corresponds to the foregoing method embodiment on the terminal side. All processes and implementations in the foregoing method embodiment may be applicable to this terminal embodiment, with the same technical effect achieved. Optionally, FIG. 8 is a schematic diagram of a hardware structure of a terminal for implementing embodiments of this application.

The terminal 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

It can be understood by those skilled in the art that the terminal 1000 may further include a power supply (for example, a battery) supplying power to the components. The power supply may be logically connected to the processor 1010 via a power management system, so that functions such as charge management, discharge management, and power consumption management are implemented by using the power management system. The structure of the terminal shown in FIG. 8 does not constitute any limitation on the terminal, and the terminal may include more or fewer components than shown in the figure, or combine some of the components, or have different arrangements of the components. Details are not described herein.

It should be understood that in this embodiment of this application, the input unit 1004 may include a graphics processing unit (GPU) 10041 and a microphone 10042. The graphics processing unit 10041 processes image data of a static picture or a video that is obtained by an image capture apparatus (for example, a camera) in a video capture mode or an image capture mode. The display unit 1006 may include a display panel 10061. The display panel 10061 may be configured in a form of a liquid crystal display, an organic light-emitting diode display, or the like. The user input unit 1007 includes a touch panel 10071 and other input devices 10072. The touch panel 10071 is also referred to as a touchscreen. The touch panel 10071 may include two parts: a touch detection apparatus and a touch controller. The other input devices 10072 may include but are not limited to a physical keyboard, a function key (for example, a volume control key or a power on/off key), a trackball, a mouse, a joystick, and the like. Details are not described herein.

In this embodiment of this application, the radio frequency unit 1001 receives a signal from a target serving cell and sends the signal to the processor 1010 for processing; and in addition, sends, to a network-side device, at least one of a low mobility state determination result of the terminal, a cell center determination result, or whether to perform relaxation measurement. Generally, the radio frequency unit 1001 includes but is not limited to an antenna, at least one amplifier, a transceiver, a coupler, a low noise amplifier, a duplexer, and the like.

The memory 1009 may be configured to store software programs or instructions and various data. The memory 1009 may include a program or instruction storage area and a data storage area. The program or instruction storage area may store an operating system, an application program or instruction required by at least one function (for example, a sound playback function or an image playback function), and the like. Further, the memory 1009 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, flash memory device, or other non-volatile solid-state storage devices.

The processor 1010 may include one or more processing units. Optionally, an application processor and a modem processor may be integrated in the processor 1010. The application processor primarily processes an operating system, user interfaces, application programs or instructions, and the like. The modem processor primarily processes radio communication, for example, being a baseband processor. It can be understood that the modem processor may alternatively be not integrated in the processor 1010.

The processor 1010 is configured to: determine, based on a measurement result for each of at least one cell group, a low mobility state determination criterion, and a cell center determination criterion, a low mobility state determination result and a cell center determination result for each of the at least one cell group; and perform measurement relaxation in a serving cell in each cell group based on the low mobility state determination result and cell center determination result for the cell group.

In the foregoing implementation, the terminal determines, based on the measurement result for each of the at least one cell group, the low mobility state determination criterion, and the cell center determination criterion, the low mobility state determination result and cell center determination result for each of the at least one cell group; determines, based on the low mobility state determination result and cell center determination result for each cell group, whether measurement relaxation can be performed in the serving cell in the cell group; and performs measurement relaxation in the serving cell in each cell group. This can enable the terminal to determine, in a case of multiple serving cells configured by a network-side device, whether to perform measurement relaxation based on actual situation of each cell group or each serving cell, providing good flexibility in terms of compromise between communication performance and power saving performance.

Optionally, the processor 1010 is configured to:

for any cell group, in a case that the low mobility state determination result of the terminal for the cell group is being in a low mobility state and the cell center determination result of the terminal for the cell group is being at the cell center, determine to perform measurement relaxation in a serving cell in the cell group, where the cell center determination result is obtained based on a cell center determination result corresponding to at least one serving cell in the cell group; or for any cell group, in a case that the low mobility state determination result of the terminal for the cell group is being in a low mobility state and a cell center determination result for at least one serving cell in the cell group is being at the cell center, determine to perform measurement relaxation in each of the at least one serving cell.

In the foregoing embodiment, for any cell group, two determination criteria need to be both satisfied to perform measurement relaxation, optionally, the low mobility state determination result of the terminal for the cell group needs to satisfy being in a low mobility state and the cell center determination result needs to satisfy being at the cell center, which can guarantee the communication performance of the terminal, and measurement relaxation can also be performed in each serving cell in the cell group, which is more flexible.

Optionally, the processor 1010 is configured to:

for a new radio NR master cell group MCG in the at least one cell group, in a case that measurement relaxation is determined to be performed in a serving cell in the MCG based on a low mobility state determination result and a cell center determination result for the MCG, perform measurement relaxation in serving cells in all of the at least one cell group; or in a case that measurement relaxation is determined to be performed for a secondary cell group SCG in the at least one cell group based on the low mobility state determination result and cell center determination result, perform measurement relaxation in a serving cell in the SCG.

In the foregoing embodiment, in the case that measurement relaxation is determined to be performed in the serving cell in the MCG, measurement relaxation is directly performed in other cell groups without determining whether measurement relaxation can be performed in the other cell groups, which saves the time for the determination and reduces the power consumption of the terminal.

Optionally, the processor 1010 is configured to:

in a case that a configuration mode for the low mobility state determination criterion is based on terminal configuration, determine the low mobility state determination result of the terminal for each cell group based on a measurement result for a primary secondary cell PSCell in an NR secondary cell group SCG configured for the first time by a network-side device;

determine the low mobility state determination result of the terminal for each cell group based on a measurement result for a primary cell PCell or a primary secondary cell PSCell in the cell group; or determine the low mobility state determination result of the terminal for each cell group based on a measurement result for at least one serving cell in the cell group; and in a case that a configuration mode for the low mobility state determination criterion is based on cell group configuration, determine the low mobility state determination result of the terminal for each cell group based on a measurement result for a primary cell PCell or a primary secondary cell PSCell in the cell group; or determine the low mobility state determination result of the terminal for each cell group based on a measurement result for at least one serving cell in the cell group.

In the foregoing embodiment, the terminal can determine, based on the configuration mode for the low mobility state determination criterion sent by the network-side device, measurement results for which serving cells in the cell group and a low mobility state determination result of the terminal for the cell group, with low processing complexity.

Optionally, the processor 1010 is configured to:

in a case that a configuration mode for the cell center determination criterion is based on terminal configuration, determine the cell center determination result of the terminal for each cell group based on a measurement result for a primary secondary cell PSCell in an NR secondary cell group SCG configured for the first time by a network-side device; or determine the cell center determination result of the terminal for each cell group based on a measurement result for a primary cell PCell or a primary secondary cell PSCell in the cell group; or determine the cell center determination result of the terminal for each cell group based on a measurement result for at least one serving cell in the cell group; and in a case that a configuration mode for the cell center determination criterion is based on cell group configuration, determine the cell center determination result of the terminal for each cell group based on a measurement result for a primary cell PCell or a primary secondary cell PSCell in the cell group; or determine the cell center determination result of the terminal for each cell group based on a measurement result for at least one serving cell in the cell group.

In the foregoing embodiment, there is greater flexibility in configuring a cell center determination criterion. Because whether a terminal is at the cell center depends on the implementation performance and algorithm of the terminal, a configuration mode for an actual cell center determination criterion can be more flexible. By using a configuration mode for the low mobility state to determine a configuration mode for the cell center determination criterion, a better reduction in signaling overheads can be achieved.

Optionally, the processor 1010 is configured to:

in a case that the cell group includes a cell of a first band and a cell of a second band, for the first band where a primary cell PCell or a primary secondary cell PSCell exists, determine a low mobility state determination result of the terminal in the first band based on a measurement result for the primary cell PCell or the primary secondary cell PSCell; and for the second band where no primary cell PCell or primary secondary cell PSCell exists, determine the low mobility state determination result of the terminal in the first band as a low mobility state determination result of the terminal in the second band.

Optionally, the processor 1010 is configured to:

in a case that the cell group includes a cell of a first band and a cell of a second band, for the first band where a primary cell PCell or a primary secondary cell PSCell exists, determine a cell center determination result of the terminal in the first band based on a measurement result for the primary cell PCell or the primary secondary cell PSCell; and for the second band where no primary cell PCell or primary secondary cell PSCell exists, determine a cell center determination result of the terminal in the second band based on a measurement result for a secondary cell SCell of the second band.

In the foregoing embodiment, for different bands, low mobility state determination results and cell center determination results of the terminal in different bands can be separately determined, and thus measurement relaxation can be separately performed in different bands, with greater flexibility.

Optionally, the processor 1010 is configured to:

in a case that a configuration mode for the low mobility state determination criterion is based on serving cell configuration, determine the low mobility state determination result of the terminal for each cell group based on a measurement result for a first or latest serving cell configured with the low mobility state determination criterion;

determine the low mobility state determination result of the terminal for each cell group based on a measurement result for a primary cell PCell or a primary secondary cell PSCell in the cell group; or determine the low mobility state determination result of the terminal for each cell group based on a measurement result for at least one serving cell in the cell group.

In the foregoing embodiment, the terminal can determine, based on the configuration mode for the low mobility state determination criterion sent by the network-side device, measurement results for which serving cells in the cell group and a low mobility state determination result of the terminal for the cell group, with low processing complexity.

Optionally, the processor 1010 is configured to:

in a case that a configuration mode for the cell center determination criterion is based on serving cell configuration, determine the cell center determination result of the terminal for each cell group based on a measurement result for a first or latest serving cell configured with the cell center determination criterion;

determine the cell center determination result of the terminal for each cell group based on a measurement result for a primary cell PCell or a primary secondary cell PSCell in the cell group; or determine the cell center determination result of the terminal for each cell group based on a measurement result for at least one serving cell in the cell group. In the foregoing embodiment, the terminal can determine, based on the configuration mode for the low mobility state determination criterion sent by the network-side device, measurement results for which serving cells in the cell group and a cell center determination result of the terminal for the cell group, with low processing complexity.

Optionally, the processor 1010 is configured to:

determine the cell center determination result of the terminal for the cell group based on a measurement result for a secondary cell SCell used for beam failure detection BFD measurement; and perform BFD measurement relaxation in a serving cell in the cell group based on the low mobility state determination result of the terminal for the cell group and the cell center determination result of the terminal for the cell group.

In the foregoing embodiment, for the BFD measurement relaxation, the cell center determination result of the terminal for the cell group may be determined based on the measurement result of the SCell used for determining BFD measurement, and measurement relaxation is determined to be performed based on the low mobility state determination result of the terminal for the cell group, which reduces the measurement overheads while making the cell in which measurement relaxation is performed more targeted.

Optionally, the processor 1010 is further configured to:

for any serving cell in each cell group, determine, according to first indication information from a network-side device, that the cell center determination criterion of the terminal for the serving cell is in effect.

Optionally, the low mobility state determination criterion is configured by a network-side device; or the low mobility state determination criterion and the cell center determination criterion are both configured by a network-side device.

Optionally, in a case that the low mobility state determination criterion is configured by a network-side device, if a configuration mode for the low mobility state determination criterion is based on terminal configuration, a configuration mode for the cell center determination criterion is based on terminal configuration;

if a configuration mode for the low mobility state determination criterion is based on cell group configuration, a configuration mode for the cell center determination criterion is based on cell group configuration; and if a configuration mode for the low mobility state determination criterion is based on serving cell configuration, a configuration mode for the cell center determination criterion is based on serving cell configuration.

Optionally, a configuration mode for the cell center determination criterion is determined based on a configuration mode for the first indication information.

In the foregoing embodiment, the terminal may determine, according to indication information sent by the network-side device, whether the cell center determination criterion is in effect, or determine a configuration mode for the cell center determination criterion based on a configuration mode for indication information, and thus determine the cell center determination result of the terminal for the cell group based on measurement results of which serving cells in the cell group, with low processing complexity.

An embodiment of this application further provides a network-side device. The network-side device includes a processor and a communication interface. The processor is configured to configure a low mobility state determination criterion for a terminal. The communication interface is configured to receive first indication information from the terminal, where the first indication information is used to indicate whether the terminal performs measurement relaxation in a serving cell in each of at least one cell group, whether the terminal performs measurement relaxation is determined based on a low mobility state determination result and a cell center determination result of the terminal for each cell group, and the low mobility state determination result and cell center determination result for each cell group are determined by the terminal based on a measurement result for each cell group, the low mobility state determination criterion, and a cell center determination criterion. The network-side device embodiment corresponds to the foregoing network-side device method embodiment. All processes and implementations in the foregoing method embodiment may be applicable to the network-side device embodiment, with the same technical effect achieved.

Figure 9:
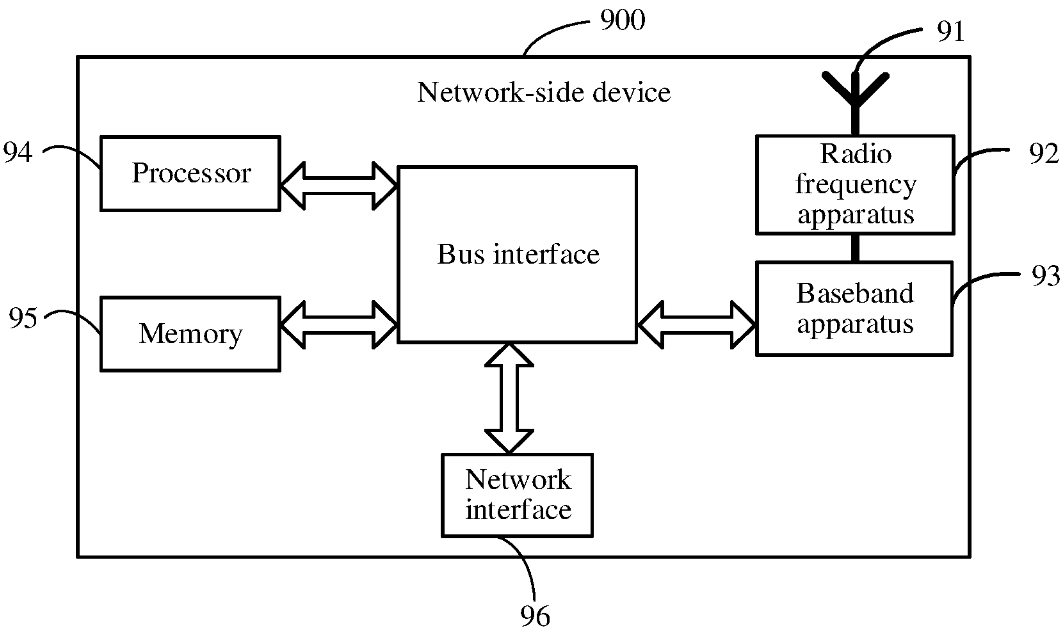
FIG. 9 is a schematic structural diagram of a network-side device according to an embodiment of this application.

An embodiment of this application further provides a network-side device. As shown in FIG. 9, the network device 900 includes an antenna 91, a radio frequency apparatus 92, and a baseband apparatus 93. The antenna 91 is connected to the radio frequency apparatus 92. In an uplink direction, the radio frequency apparatus 92 receives information by using the antenna 91, and sends the received information to the baseband apparatus 93 for processing. In a downlink direction, the baseband apparatus 93 processes to-be-sent information, and sends the information to the radio frequency apparatus 92; and the radio frequency apparatus 92 processes the received information and then sends the information out by using the antenna 91.

The radio frequency apparatus 92 may be located in the baseband apparatus 93. The method executed by the network-side device in the foregoing embodiments may be implemented in the baseband apparatus 93, and the baseband apparatus 93 includes a processor 94 and a memory 95.

The baseband apparatus 93 may include, for example, at least one baseband board, where a plurality of chips are disposed on the baseband board. As shown in FIG. 9, one of the chips is, for example, the processor 94, and connected to the memory 95, to invoke the program in the memory 95 to perform the operations of the network device shown in the foregoing method embodiment.

The baseband apparatus 93 may further include a network interface 96 configured to exchange information with the radio frequency apparatus 92, where the interface is, for example, a common public radio interface (CPRI).

The network-side device in this embodiment of this application further includes: instructions or a program stored in the memory 95 and capable of running on the processor 94. The processor 94 invokes the instructions or program in the memory 95 to execute the method executed by the modules shown in FIG. 6, with the same technical effects achieved. To avoid repetition, details are not described herein again.

An embodiment of this application further provides a non-transitory readable storage medium. The non-transitory readable storage medium stores a program or instructions. When the program or instructions are executed by a processor, each process of the foregoing measurement relaxation method embodiment is implemented, with the same technical effect achieved. To avoid repetition, details are not described herein again.

The processor is a processor in the terminal described in the foregoing embodiment. The non-transitory readable storage medium includes a non-transitory computer-readable storage medium such as a computer read-only memory (ROM), a random access memory (RAM), a magnetic disk, or an optical disc.

An embodiment of this application further provides a chip. The chip includes a processor and a communication interface. The communication interface is coupled to the processor. The processor is configured to run a program or instructions to implement each process of the foregoing measurement relaxation method embodiment, with the same technical effect achieved. To avoid repetition, details are not described herein again.

It should be understood that the chip mentioned in the embodiments of this application may also be referred to as a system-level chip, a system chip, a chip system, a system-on-chip, or the like.

An embodiment of this application further provides a computer program product. The computer program product includes a computer program, where the computer program is executed by a processor to implement all processes of the foregoing measurement relaxation method embodiment, with the same technical effect achieved. To avoid repetition, details are not described herein again.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

By means of the foregoing description of the implementations, persons skilled in the art may clearly understand that the method in the foregoing embodiment may be implemented by software with a necessary general hardware platform. Certainly, the method in the foregoing embodiment may also be implemented by hardware. However, in many cases, the former is a preferred implementation. Based on such an understanding, the technical solutions of this application essentially or the part contributing to the prior art may be implemented in a form of a computer software product. The computer software product is stored in a non-transitory storage medium (such as a ROM/RAM, a magnetic disk, or an optical disc), and includes several instructions for instructing a terminal (which may be a mobile phone, a computer, a server, a network device, or the like) to perform the methods described in the embodiments of this application.

The foregoing describes the embodiments of this application with reference to the accompanying drawings. However, this application is not limited to the foregoing embodiments. The foregoing embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A measurement relaxation method, comprising:

determining, by a terminal based on a measurement result for each of at least one cell group, a low mobility state determination criterion, and a cell center determination criterion, a low mobility state determination result and a cell center determination result for each of the at least one cell group; and performing, by the terminal, measurement relaxation in a serving cell in each cell group based on the low mobility state determination result and cell center determination result for the cell group;

wherein the performing, by the terminal, measurement relaxation in the serving cell in each cell group based on the low mobility state determination result and cell center determination result for the cell group comprises:

in a case that measurement relaxation is determined to be performed for a secondary cell group (SCG) in the at least one cell group based on the low mobility state determination result and cell center determination result, performing, by the terminal, measurement relaxation in a serving cell in the SCG.

2. The measurement relaxation method according to claim 1, wherein the performing, by the terminal, measurement relaxation in a serving cell in each cell group based on the low mobility state determination result and cell center determination result for the cell group comprises:

for any cell group, in a case that a low mobility state determination result of the terminal for the cell group is being in a low mobility state and a cell center determination result of the terminal for the cell group is being at a cell center, determining, by the terminal, to perform measurement relaxation in a serving cell in the cell group, wherein the cell center determination result of the terminal for the cell group is obtained based on a cell center determination result corresponding to at least one serving cell in the cell group; or for any cell group, in a case that the low mobility state determination result of the terminal for the cell group is being in a low mobility state and a cell center determination result for at least one serving cell in the cell group is being at the cell center, determining, by the terminal, to perform measurement relaxation in each of the at least one serving cell.

3. The measurement relaxation method according to claim 1, wherein the determining a low mobility state determination result for each of the at least one cell group comprises:

in a case that a configuration mode for the low mobility state determination criterion is based on terminal configuration, determining, by the terminal, a low mobility state determination result of the terminal for each cell group based on a measurement result for a primary secondary cell (PSCell) in a new radio (NR) SCG configured for a first time by a network-side device;

determining, by the terminal, the low mobility state determination result of the terminal for each cell group based on a measurement result for a primary cell (PCell) or a PSCell in the cell group; or determining, by the terminal, the low mobility state determination result of the terminal for each cell group based on a measurement result for at least one serving cell in the cell group; and in a case that the configuration mode for the low mobility state determination criterion is based on cell group configuration, determining, by the terminal, the low mobility state determination result of the terminal for each cell group based on the measurement result for the PCell or the PSCell in the cell group; or determining, by the terminal, the low mobility state determination result of the terminal for each cell group based on the measurement result for the at least one serving cell in the cell group.

4. The measurement relaxation method according to claim 3, wherein the determining, by the terminal, the low mobility state determination result of the terminal for each cell group based on the measurement result for the PCell or the PSCell in the cell group comprises:

in a case that the cell group comprises a cell of a first band and a cell of a second band, for the first band where a PCell or a PSCell exists, determining, by the terminal, a low mobility state determination result of the terminal in the first band based on a measurement result for the PCell or the PSCell; and for the second band where no PCell or PSCell exists, determining, by the terminal, the low mobility state determination result of the terminal in the first band as a low mobility state determination result of the terminal in the second band.

5. The measurement relaxation method according to claim 1, wherein the determining a cell center determination result for each of the at least one cell group comprises:

in a case that a configuration mode for the cell center determination criterion is based on terminal configuration, determining, by the terminal, a cell center determination result of the terminal for each cell group based on a measurement result for a primary secondary cell (PSCell) in a new radio (NR) SCG configured for a first time by a network-side device;

determining, by the terminal, the cell center determination result of the terminal for each cell group based on a measurement result for a primary cell (PCell) or a PSCell in the cell group; or determining, by the terminal, the cell center determination result of the terminal for each cell group based on a measurement result for at least one serving cell in the cell group; and in a case that the configuration mode for the cell center determination criterion is based on cell group configuration, determining, by the terminal, the cell center determination result of the terminal for each cell group based on a measurement result for the PCell or the PSCell in the cell group; or determining, by the terminal, the cell center determination result of the terminal for each cell group based on the measurement result for the at least one serving cell in the cell group.

6. The measurement relaxation method according to claim 5, wherein the determining, by the terminal, the cell center determination result of the terminal for each cell group based on the measurement result for the PCell or the PSCell in the cell group comprises:

in a case that the cell group comprises a cell of a first band and a cell of a second band, for the first band where a PCell or a PSCell exists, determining, by the terminal, a cell center determination result of the terminal in the first band based on a measurement result for the PCell or the PSCell; and for the second band where no PCell or PSCell exists, determining, by the terminal, a cell center determination result of the terminal in the second band based on a measurement result for a secondary cell (SCell) of the second band.

7. The measurement relaxation method according to claim 1, wherein the determining a low mobility state determination result for each of the at least one cell group comprises:

in a case that a configuration mode for the low mobility state determination criterion is based on serving cell configuration, determining, by the terminal, a low mobility state determination result of the terminal for each cell group based on a measurement result for a first or latest serving cell configured with the low mobility state determination criterion;

determining, by the terminal, the low mobility state determination result of the terminal for each cell group based on a measurement result for a primary cell (PCell) or a primary secondary cell (PSCell) in the cell group; or determining, by the terminal, the low mobility state determination result of the terminal for each cell group based on a measurement result for at least one serving cell in the cell group; wherein the performing, by the terminal, measurement relaxation in a serving cell in the cell group based on the low mobility state determination result and cell center determination result for the cell group comprises:

determining, by the terminal, a cell center determination result of the terminal for the cell group based on a measurement result for a secondary cell (SCell) used for beam failure detection (BFD) measurement; and performing, by the terminal, BFD measurement relaxation in the serving cell in the cell group based on the low mobility state determination result of the terminal for the cell group and the cell center determination result of the terminal for the cell group.

8. The measurement relaxation method according to claim 1, wherein the determining a cell center determination result for each of the at least one cell group comprises:

in a case that a configuration mode for the cell center determination criterion is based on serving cell configuration, determining, by the terminal, a cell center determination result of the terminal for each cell group based on a measurement result for a first or latest serving cell configured with the cell center determination criterion;

determining, by the terminal, the cell center determination result of the terminal for each cell group based on a measurement result for a primary cell (PCell) or a primary secondary cell (PSCell) in the cell group; or determining, by the terminal, the cell center determination result of the terminal for each cell group based on a measurement result for at least one serving cell in the cell group.

9. The measurement relaxation method according to claim 1, wherein the method further comprises:

for any serving cell in each cell group, determining, by the terminal according to first indication information from a network-side device, that a cell center determination criterion of the terminal for the serving cell is in effect.

10. The measurement relaxation method according to claim 1, wherein the low mobility state determination criterion is configured by a network-side device; or the low mobility state determination criterion and the cell center determination criterion are both configured by the network-side device; wherein in a case that the low mobility state determination criterion is configured by the network-side device, if a configuration mode for the low mobility state determination criterion is based on terminal configuration, a configuration mode for the cell center determination criterion is based on terminal configuration;

if the configuration mode for the low mobility state determination criterion is based on cell group configuration, the configuration mode for the cell center determination criterion is based on cell group configuration; and if the configuration mode for the low mobility state determination criterion is based on serving cell configuration, the configuration mode for the cell center determination criterion is based on serving cell configuration.

11. The measurement relaxation method according to claim 9, wherein a configuration mode for the cell center determination criterion is determined based on a configuration mode for the first indication information.

12. A measurement relaxation method, comprising:

configuring, by a network-side device, a low mobility state determination criterion for a terminal; and receiving, by the network-side device, first indication information from the terminal, wherein the first indication information is used to indicate whether the terminal performs measurement relaxation in a serving cell in each of at least one cell group, whether the terminal performs measurement relaxation is determined based on a low mobility state determination result and a cell center determination result of the terminal for each of the at least one cell group, and the low mobility state determination result and cell center determination result for each cell group are determined by the terminal based on a measurement result for each cell group, the low mobility state determination criterion, and a cell center determination criterion;

wherein the terminal performs measurement relaxation comprises:

in a case that measurement relaxation is determined to be performed for a secondary cell group (SCG) in the at least one cell group based on the low mobility state determination result and cell center determination result, the terminal performs measurement relaxation in a serving cell in the SCG.

13. The measurement relaxation method according to claim 12, wherein in a case that a configuration mode for the low mobility state determination criterion is based on terminal configuration, the low mobility state determination result of the terminal for each cell group is determined by the terminal based on a measurement result for a primary secondary cell (PSCell) in a new radio (NR) SCG configured for a first time by the network-side device;

the low mobility state determination result of the terminal for each cell group is determined by the terminal based on a measurement result for a primary cell (PCell) or a PSCell in the cell group; or the low mobility state determination result of the terminal for each cell group is determined by the terminal based on a measurement result for at least one serving cell in the cell group; and in a case that the configuration mode for the low mobility state determination criterion is based on cell group configuration, the low mobility state determination result of the terminal for each cell group is determined by the terminal based on the measurement result for the PCell or the PSCell in the cell group; or the low mobility state determination result of the terminal for each cell group is determined by the terminal based on the measurement result for the at least one serving cell in the cell group.

14. The measurement relaxation method according to claim 13, wherein in a case that the cell group comprises a cell of a first band and a cell of a second band, for the first band where a PCell or a PSCell exists, a low mobility state determination result of the terminal in the first band is determined by the terminal based on a measurement result for the PCell or the PSCell; and for the second band where no PCell or PSCell exists, a low mobility state determination result of the terminal in the second band is the low mobility state determination result of the terminal in the first band.

15. The measurement relaxation method according to claim 12, wherein in a case that a configuration mode for the cell center determination criterion is based on terminal configuration, the cell center determination result of the terminal for each cell group is determined by the terminal based on a measurement result for a primary secondary cell (PSCell) in a new radio (NR) SCG configured for a first time by the network-side device;

the cell center determination result of the terminal for each cell group is determined by the terminal based on a measurement result for a primary cell (PCell) or a PSCell in the cell group; or the cell center determination result of the terminal for each cell group is determined by the terminal based on a measurement result for at least one serving cell in the cell group; and in a case that the configuration mode for the cell center determination criterion is based on cell group configuration, the cell center determination result of the terminal for each cell group is determined by the terminal based on the measurement result for PCell or the PSCell in the cell group; or the cell center determination result of the terminal for each cell group is determined by the terminal based on the measurement result for the at least one serving cell in the cell group.

16. The measurement relaxation method according to claim 15, wherein in a case that the cell group comprises a cell of a first band and a cell of a second band, for the first band where a PCell or a PSCell exists, a cell center determination result of the terminal in the first band is determined by the terminal based on a measurement result for the PCell or PSCell; and for the second band where no PCell or PSCell exists, a cell center determination result of the terminal in the second band is determined by the terminal based on a measurement result for a secondary cell (SCell) of the second band.

17. The measurement relaxation method according to claim 12, wherein in a case that a configuration mode for the low mobility state determination criterion is based on serving cell configuration, the low mobility state determination result of the terminal for each cell group is determined by the terminal based on a measurement result for a first or latest serving cell configured with the low mobility determination criterion;

the low mobility state determination result of the terminal for each cell group is determined by the terminal based on a measurement result for a primary cell (PCell) or a primary secondary cell (PSCell) in the cell group; or the low mobility state determination result of the terminal for each cell group is determined by the terminal based on a measurement result for at least one serving cell in the cell group; wherein the terminal performing beam failure detection (BFD) measurement relaxation in a serving cell in the cell group is determined by the terminal based on the low mobility state determination of the terminal for the cell group and the cell center determination result of the terminal for the cell group; wherein the cell center determination result of the terminal for the cell group is determined by the terminal based on a measurement result for a secondary cell (SCell) used for BFD measurement.

18. The measurement relaxation method according to claim 12, wherein in a case that a configuration mode for the cell center determination criterion is based on serving cell configuration, the cell center determination result of the terminal for each cell group is determined by the terminal based on a measurement result for a first or latest serving cell configured with the cell center determination criterion;

the cell center determination result of the terminal for each cell group is determined by the terminal based on a measurement result for a primary cell (PCell) or a primary secondary cell (PSCell) in the cell group; or the cell center determination result of the terminal for each cell group is determined by the terminal based on a measurement result for each serving cell in the cell group.

19. The measurement relaxation method according to claim 12, wherein the method further comprises:

sending, by the network-side device, second indication information to the terminal, wherein the second indication information is used to indicate that the cell center determination criterion of the terminal for the serving cell in the cell group is in effect.

20. A terminal, comprising: a processor, a memory, and a program or instructions stored in the memory and capable of running on the processor, wherein the program or instructions, when executed by the processor, cause the terminal to perform:

determining, based on a measurement result for each of at least one cell group, a low mobility state determination criterion, and a cell center determination criterion, a low mobility state determination result and a cell center determination result for each of the at least one cell group; and performing measurement relaxation in a serving cell in each cell group based on the low mobility state determination result and cell center determination result for the cell group;

wherein the program or instructions, when executed by the processor, cause the terminal to perform:

in a case that measurement relaxation is determined to be performed for a secondary cell group (SCG) in the at least one cell group based on the low mobility state determination result and cell center determination result, performing measurement relaxation in a serving cell in the SCG.

* * * * *